(12) United States Patent
Barker

(10) Patent No.: US 7,249,184 B1
(45) Date of Patent: Jul. 24, 2007

(54) SYSTEM AND METHOD FOR GENERATING A WORLD WIDE NAME FOR USE WITH HOST FOR ENABLING COMMUNICATION WITH A DATA STORAGE SYSTEM

(75) Inventor: Gregory Barker, Milford, CT (US)

(73) Assignee: EMC Corporation, Hopkinton, MA (US)

( * ) Notice: Subject to any disclaimer, the term of this patent is extended or adjusted under 35 U.S.C. 154(b) by 14 days.

(21) Appl. No.: 10/403,473

(22) Filed: Mar. 31, 2003

(51) Int. Cl.
*G06F 15/16* (2006.01)

(52) U.S. Cl. .................... 709/227; 709/217; 709/226; 709/228; 709/245; 711/114; 711/152; 710/305

(58) Field of Classification Search .............. 709/217, 709/226–228, 245; 711/114, 152; 710/305
See application file for complete search history.

(56) References Cited

U.S. PATENT DOCUMENTS

| | | | |
|---|---|---|---|
| 6,779,083 B2 * | 8/2004 | Ito et al. ..................... 711/114 |
| 6,877,042 B2 * | 4/2005 | Tawil et al. ................. 709/250 |
| 7,028,085 B2 * | 4/2006 | Nakagawa et al. ......... 709/224 |
| 7,127,638 B1 * | 10/2006 | Sardella et al. ............... 714/15 |
| 2002/0087727 A1 * | 7/2002 | Tawil et al. ................. 709/245 |
| 2003/0014600 A1 * | 1/2003 | Ito et al. ...................... 711/152 |
| 2003/0041207 A1 * | 2/2003 | Kamakura et al. .......... 710/305 |
| 2003/0120743 A1 * | 6/2003 | Coatney et al. ............. 709/217 |
| 2003/0182501 A1 * | 9/2003 | George et al. ............... 711/114 |

* cited by examiner

*Primary Examiner*—Saleh Najjar
*Assistant Examiner*—Liang-che Alex Wang
(74) *Attorney, Agent, or Firm*—Krishnendu Gupta; Robert Kevin Perkins; Jason A. Reyes

(57) ABSTRACT

The present invention is a system, method, and apparatus for generating a world wide name for enabling a host computer to communicate with a data storage system.

8 Claims, 25 Drawing Sheets

```
###########################################
#
#         "Host Configuration Tool"       #
#                                         #
#         Version: 8.7.0 Data: 01/06/03   #
#         For Connecting A Sun Solaris Host To
#      A SYMMETRIX Via Arbitrated Loop, Or Switched Fabric
#   Or A CLARiiON CX600, CX400, FC4700, FC4500 Via Switched Fabric
#                                         #
#                                         #
#            Press Enter To Continue      #
###########################################
```
120

FIG. 10

```
###########################################
#
#    PLEASE PICK ONE OF THE FOLLOWING OPTIONS:
#                                         #
#    [DEFAULT]   1) SUN HOST OS 2.9       #
#                2) SUN HOST OS 2.7 / 2.8 #
#                3) SUN HOST OS 2.5.1 / 2.6
#                                         #
###########################################
```
122

FIG. 11

```
###########################################
#              Pick An FA or FAs           #
# ---------------------------------------- #
# Here Is A List Of FA's Which Could Be Available For #
# Symm Serial #: 181492111 Model #: 35/5500 Elephant  #
# ---------------------------------------- #
# For 2 Port FA's                          #
# Enter The Number Next To The "FA#aA" For "A" Side   #
# And "FA#bA" For The "B" Side             #
# For 4 Port FA's                          #
# Enter The Number Next To The "FA#aA" Or "aB" Or "bA" Or "bB" #
# ---------------------------------------- #
# To "Fan Out", Select The Numbers Next To The FAs To Connect  #
# Example: 3,5,21,29 This Would Connect 4 FAs To One HBA       #
#                                          #
#   1) Ø3aA    #  2) Ø3aB   #  3) Ø3bA   #  4) Ø3bB   #
#   5) Ø4aA    #  6) Ø4aB   #  7) Ø4bA   #  8) Ø4bB   #
#   9) Ø5aA    # 10) Ø5aB   # 11) Ø5bA   # 12) Ø5bB   #
#  13) Ø6aA    # 14) Ø6aB   # 15) Ø6bA   # 16) Ø6bB   #
#  17) 11aA    # 18) 11aB   # 19) 11bA   # 20) 11bB   #
#  21) 12aA    # 22) 12aB   # 23) 12bA   # 24) 12bB   #
#  25) 13aA    # 26) 13aB   # 27) 13bA   # 28) 13bB   #
#  29) 14aA    # 30) 14aB   # 31) 14bA   # 32) 14bB   #
# ---------------------------------------- #
#         Enter The Number Next To The FA. #
###########################################
```
144

FIG. 22

```
###########################################
#
#    50:06:04:82:b4:56:63:c2 Is This Correct? For Ø3aA  #
#                                          #
# [DEFAULT]   1) Continue With This WWN 50:06:04:82:b4:56:63:c2  #
#             2) If Incorrect, Enter 2 To Change  #
###########################################
```
146

FIG. 23

INPUT OF AN ACTUAL SYMMETRIX SERIAL NUMBER

TO DISPLAY ANY WWN's FOR THE SYMMETRIX
YOU HAVE TO ENTER ONE OR MULTIPLE NUMBERS
WHICH ARE TO THE LEFT OF THE FA#'s YOU WANT TO DISPLAY

AT THIS POINT ONE CAN EITHER QUIT OR CHECK
MORE WWN's FOR SYMMETRIX OR CLARiiON
OR EXPORT THE ABOVE LIST TO AN EXCEL SPREADSHEET

BY SELECTING THE SECOND CHOICE IN THE ABOVE SCREEN
THIS MENU PROMPTS YOU FOR EITHER THE DEFAULT PATH
TO EXPORT OR ALLOWING YOU THE OPTION
OF ENTERING YOUR OWN PATH

SYSTEM AND METHOD FOR GENERATING A WORLD WIDE NAME FOR USE WITH HOST FOR ENABLING COMMUNICATION WITH A DATA STORAGE SYSTEM

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to management of host computers operating in a data storage environment, and more particularly to a system and method for configuring a host computer to cooperate with one or more data storage systems in such an environment.

BACKGROUND OF THE INVENTION

Computer systems may include different resources used by one or more host processors. Resources and host processors in a computer system may be interconnected by one or more communication connections. These resources may include, for example, data storage systems, such as the Clariion or Symmetrix family of data storage systems manufactured by EMC Corporation of Hopkinton, Mass. These data storage systems may be coupled to one or more host processors and provide storage services to each host processor.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et herein incorporated in their respective entirety by this reference.

Data storage systems are widely used because of all the function and feature they provide, but configuring a computer, such as a host computer that must operationally cooperate with such a system is problematic. Problems exist with installing, maintaining, configuring, upgrading and/or revising such a host computer for more than one reason. Some problems exist because the host requires specific editing of complex files exposing the process to potential errors due to complexity and tedious operations. Other problems, which may co-exist with those discussed above, exist because there is typically very widespread distribution of systems and their components. For example, a network may have several storage systems distributed globally. Configuration of a host to operate within a particular data storage environment is taxing, but sometimes multiple configurations may be required as components are added or the overall system is upgraded. It would be advantageous if a tool to help with host configuration could be performed by someone who is not particularly skilled with complex administration or software skills. Therefore it would be an advantage if such a tool could be easy to use, but it would also be an advantage if such software could be easily updated as the software product being installed is revised or upgraded. The same set of problems applies to software used for maintenance, upgrades and revisions, and therefore the same set of advantages are also desirable for software used in such activities.

SUMMARY OF THE INVENTION

The present invention is a method, apparatus, and system including a computer-readable medium encoded for performing certain process steps, and wherein each is for generating a world wide name related to a component in a data storage system for use in enabling a host computer to communicate with the data storage system.

An embodiment of the method includes receiving information related to the selection of a data storage system for communicating with the host computer, presenting a list of communication channels or interfaces at the data storage system based on the received information, receiving information related to the selection of at least one communication channel or interface from the list; and generating a world wide name for each communication channel or interface selected for which information was received, wherein the world wide name is useful for enabling the host computer to communicate with the selected data storage system.

In other embodiments the invention includes an apparatus and system that is configured for carrying out process steps similar to those described above in reference to the method embodiment of this invention.

BRIEF DESCRIPTION OF THE DRAWINGS

The above and further advantages of the present invention may be better under stood by referring to the following description taken into conjunction with the accompanying drawings in which:

FIG. 10 is an exemplary representation of a user screen for enabling the use of the tool of FIG. 1;

FIG. 11 is another exemplary representation of a user screen for enabling the use of the tool of FIG. 1;

FIG. 22 is another exemplary representation of a user screen for enabling the use of the tool of FIG. 1;

FIG. 23 is another exemplary representation of a user screen for enabling the use of the tool of FIG. 1;

DETAILED DESCRIPTION OF THE PREFERRED EMBODIMENT

Introduction and General

The system, methods and apparatus of the present invention may be used with data storage systems, such as the Clariion Data Storage System and the Symmetrix Integrated Cache Disk Array system, each available from EMC Corporation of Hopkinton, Mass.

Figure 1:
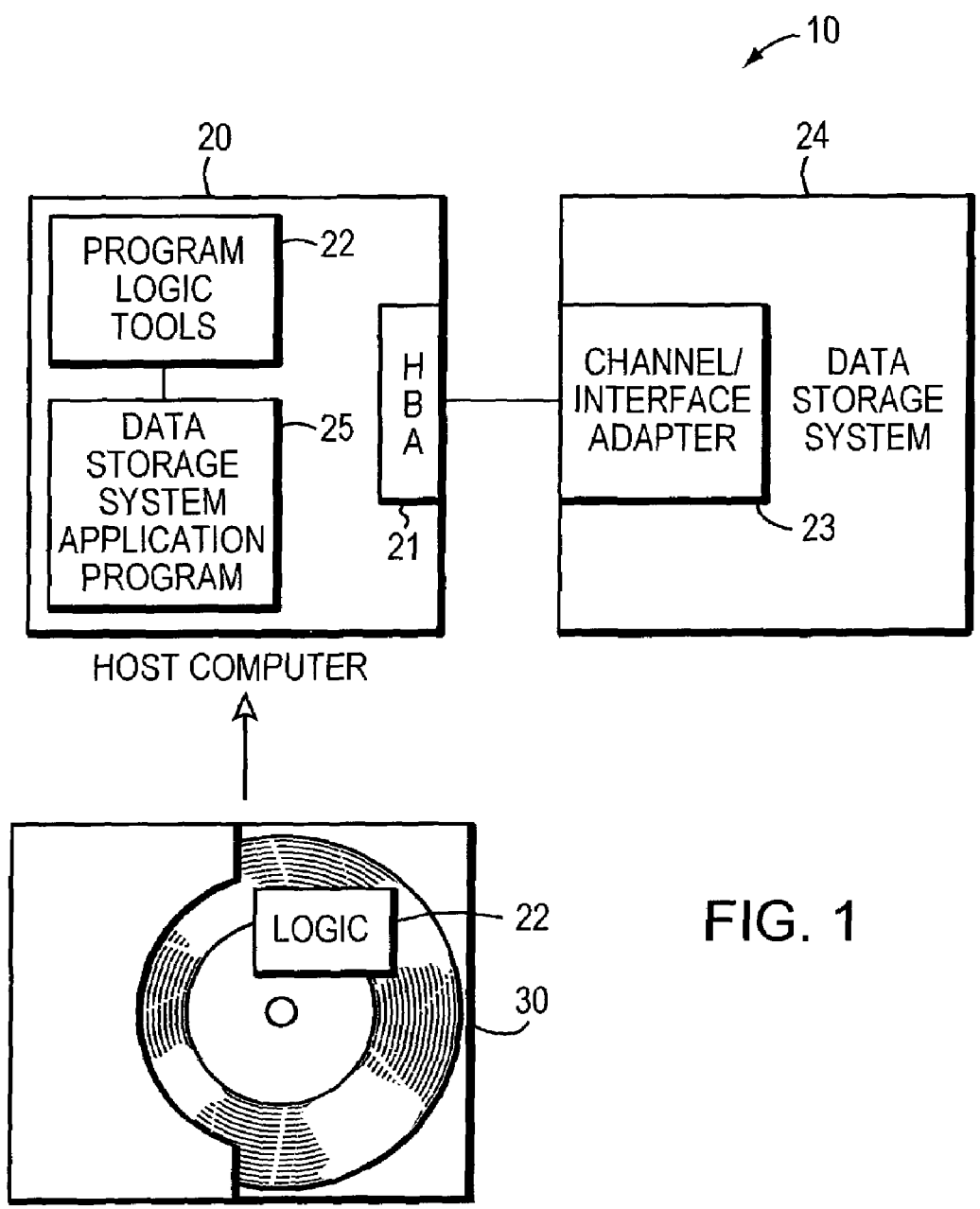
FIG. 1 is a schematic of a diagrammatic relationship of a functional block diagram showing a data storage environment including a host, a data storage system, and a tool including computer code or program logic for configuring the host to cooperatively function with the data storage system in the data storage environment and showing a computer-readable medium encoded with the computer code or program logic.

The methods and apparatus of this invention may take the form, at least partially, of program code (i.e., instructions) embodied in tangible storage media, such as floppy diskettes, CD-ROMs, hard drives, random access or read only-memory, or any other machine-readable storage medium, such as medium 30 (FIG. 1). The program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

The Preferred Embodiment

FIG. 1 shows a data storage environment 10 including a data storage system 24, which in a preferred embodiment is a Clariion or Symmetrix from EMC Corporation of Hopkinton, Mass. The data storage system 24 includes a host interface adapter 23, a Fibre Channel, SCSI adapter or iSCSI adapter for communicating with a host adapter in the host computer 20 known as host bus adapter (HBA) 21 in the preferred environment. Computer 20 includes program logic tool 22, which in a preferred embodiment is configured in Perl language program code. A Data Storage System Application Program 25, such as EMC PowerPath available from EMC or Veritas DMP, which is available from Veritas Software Corporation, Mountain View, Calif., USA, interfaces operationally with logic 22. The logic 22 may also be included on a computer-readable medium 30 for enabling the carrying out of the methods and processes of this invention described herein. When loaded into ordinary well-known computer memory (not shown) of computer 20 and executed by a well-known CPU (also not shown) of the computer 20, the logic enables the computer to become a special purpose apparatus for carrying out the invention. The execution of the logic invokes a computer process for carrying out the method steps described herein.

The tool or logic 22 includes several modules, including a Run module 32, Connect module 34, Select module 36, World Wide Name (WWN) module 38, and Configure module 40, and Update module 42. These modules are involved in carrying out the method of this invention described below with reference to FIGS. 3-9 and user screen representations in FIGS. 10-26, below.

Generally, the tool embodied in this invention may be used aid configuration of a host computer, such as a SUN Solaris host for connection and cooperative operation with a data storage system, e.g. either an EMC Symmetrix or Clariion disk array via various switching and topological schemes including via "Switched Fabric" or "Arbitrated Loop". This tool is designed to automate the initial setup and configuration of a SUN Solaris host, for both Symmetrix and Clariion attachments.

Advantages provided by the invention include reduction of errors while configuring host computers that must communicate and cooperatively operate with data storage systems. In prior art techniques for configuring hosts may have included the use of ad hoc scripts and procedures that could lead to problems and unpredictable results. Otherwise such configuring has been performed on a manual basis, which is at least time-consuming and costly in terms of human capital. Prior art tools may have included specialized tools that were customized and not able to provide general flexibility as is provided by the present invention.

In summary, the present invention expedites the configuration of a host for connection to a data storage system, reduces the possibility of errors when editing configuration files and increases the accuracy of configuration file settings. It also saves time by automating the tasks required to configure a SUN host.

Preferably the tool is embodied in program code or logic, such as a compiled program in the PERL programming language. While the exemplary embodiment discussed herein is shown operating in a SUN and thus Unix OS environment the general teachings are applicable in various environments including an Intel-based computer operating in the Windows OS environment, or computing environments, which may be developed in the future. The tool may support multiple file configurations and different HBA types. An important advantage provided by the tool is its ability to calculate WWN's in accordance with predetermined formula for doing so in accordance with protocols prescribed for a particular data storage system for which the host to be configured with is cooperatively operational. In the exemplary embodiment this is illustrated with reference to preferred Symmetrix Fibre Adapters (FA's) or Clariion Storage Processors (SP's), each of which can interface with an appropriately configured HBA.

Figure 2:
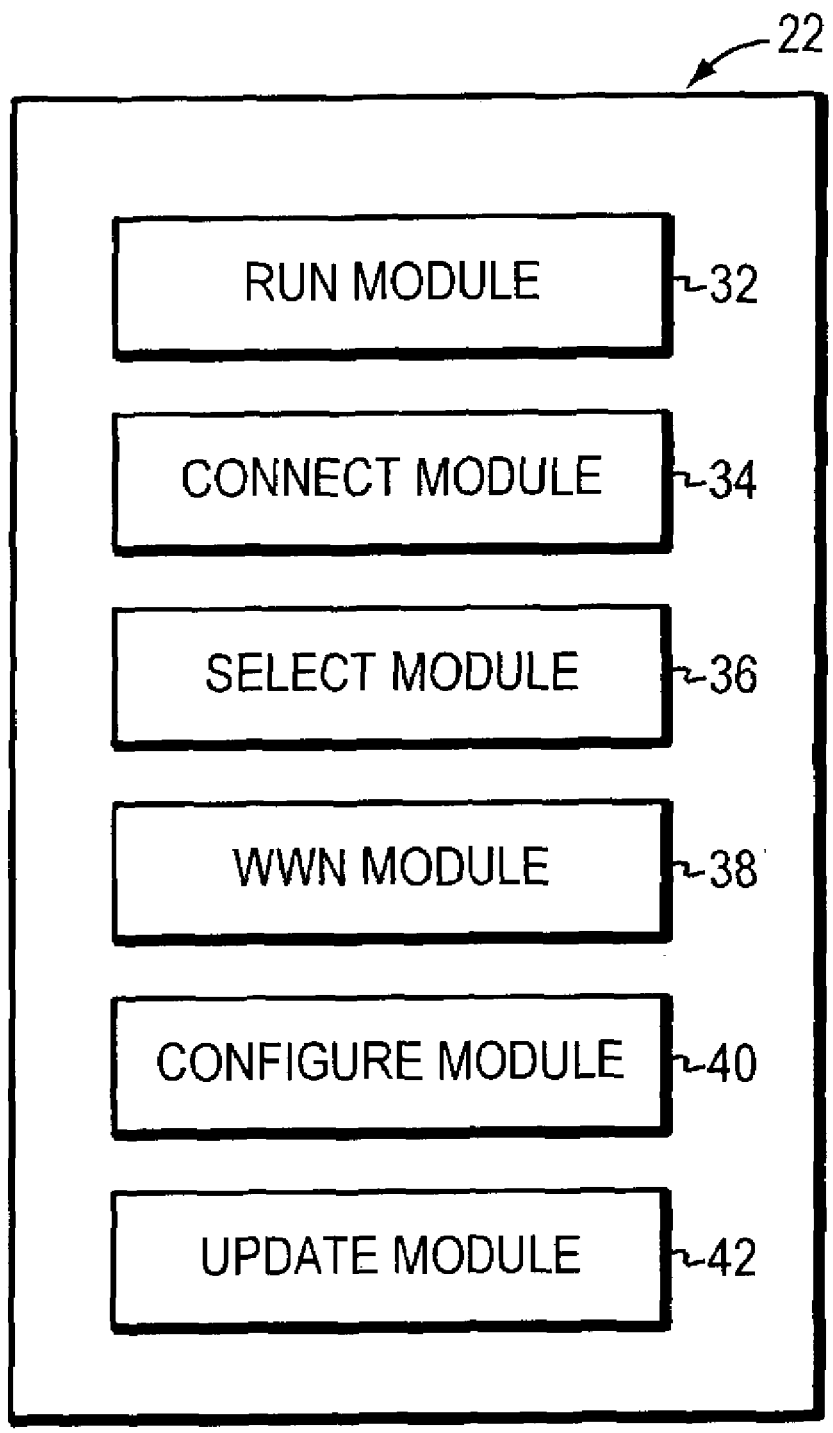
FIG. 2 is a further schematic showing functional relationships of computer code or program logic for carrying out the configuration of the host of FIG. 1 for cooperatively operating with the data storage system, also of FIG. 1.

FIGS. 3-9 show logical flow diagrams of the method of this invention carried out with the tool of FIG. 1, which is further detailed in FIG. 2, and reference is also made herein to screen shots simply portrayed in FIGS. 10-26 which give an exemplary view of the operation of the tool on host 20.

Figure 3:
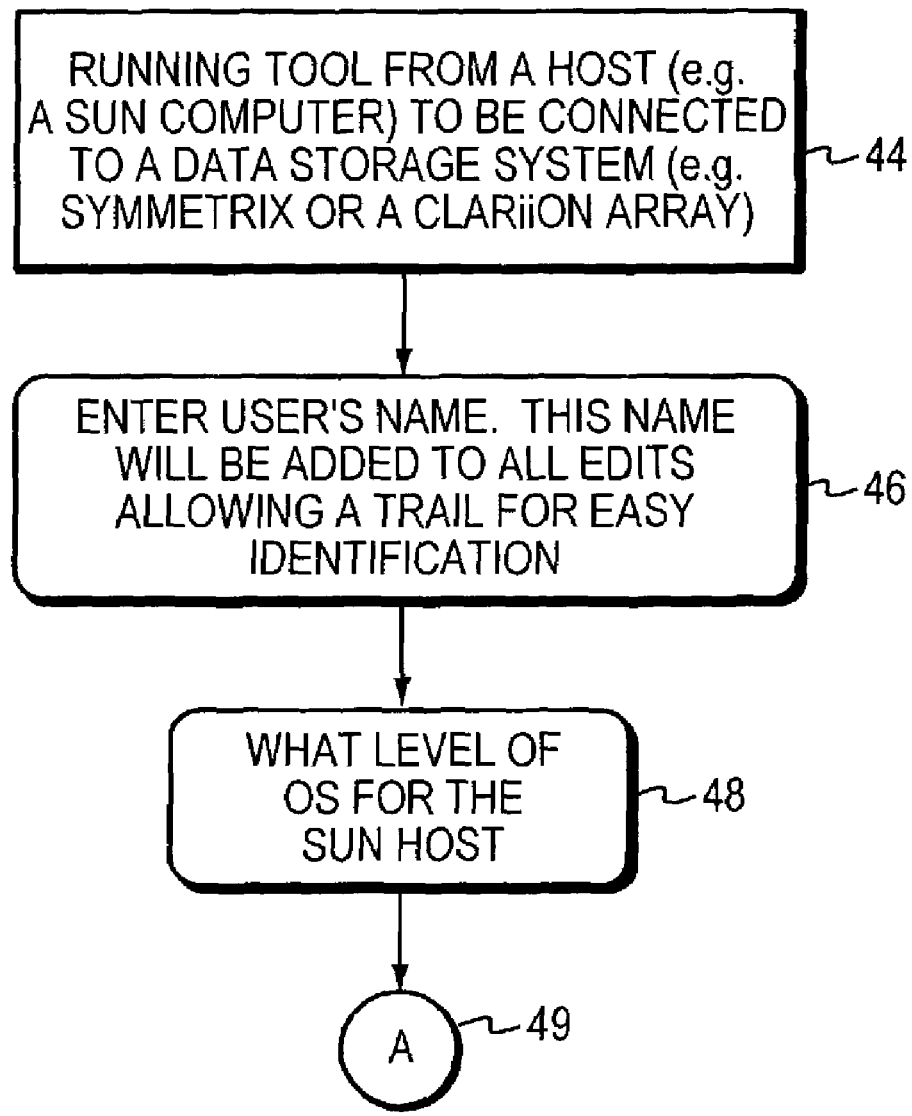
FIG. 3 is a logical flow diagram of the method of this invention carried out with the tool of FIG. 1.

Referring to FIG. 3, the Tool 22 is run on host computer 20, which in a preferred environment is a Unix-based computer, such as a Sun Computer from Sun Microsystems of Santa Clara, Calif., USA. FIG. 10 shows startup of the tool on screen shot 120, and this also shows operation of the Run module 32 (FIG. 2). The host 20 needs to be connected for operational cooperation, including communication, with data storage system 24, which in a preferred embodiment is an EMC Clariion or Symmetrix Disk Array, and communication occurs over adapter 23. In step 43, an optional identification step of entering the user's name is carried out. The level of the host is defined in step 48, and FIG. 11 shows a representation of operating system levels, which a user may select from a menu of options shown on screen shot 122. Connecting step 49 identified with letter A flows into identical step 49 in FIG. 4.

Figure 4:
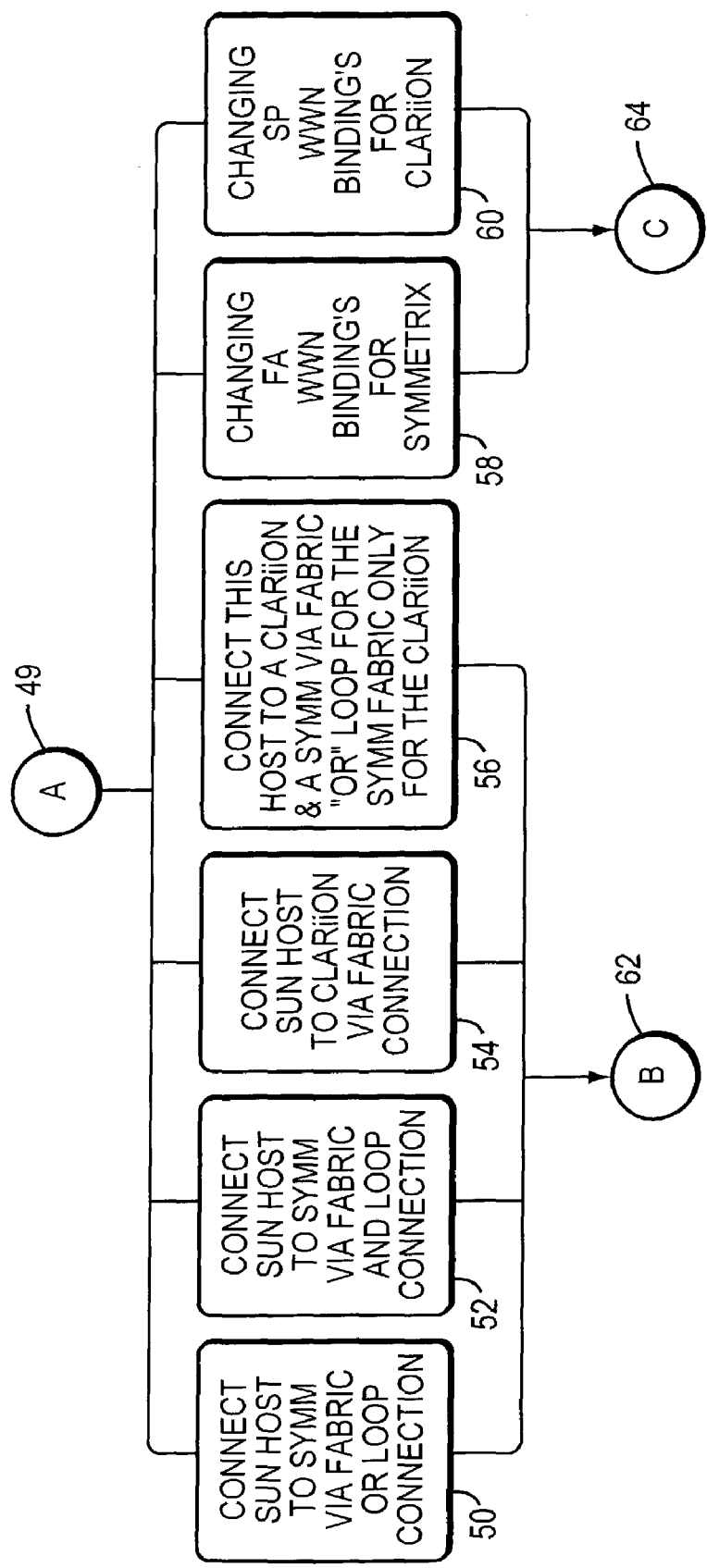
FIG. 4 is another logical flow diagram of the method of this invention carried out with the tool of FIG. 1.
Figure 12:
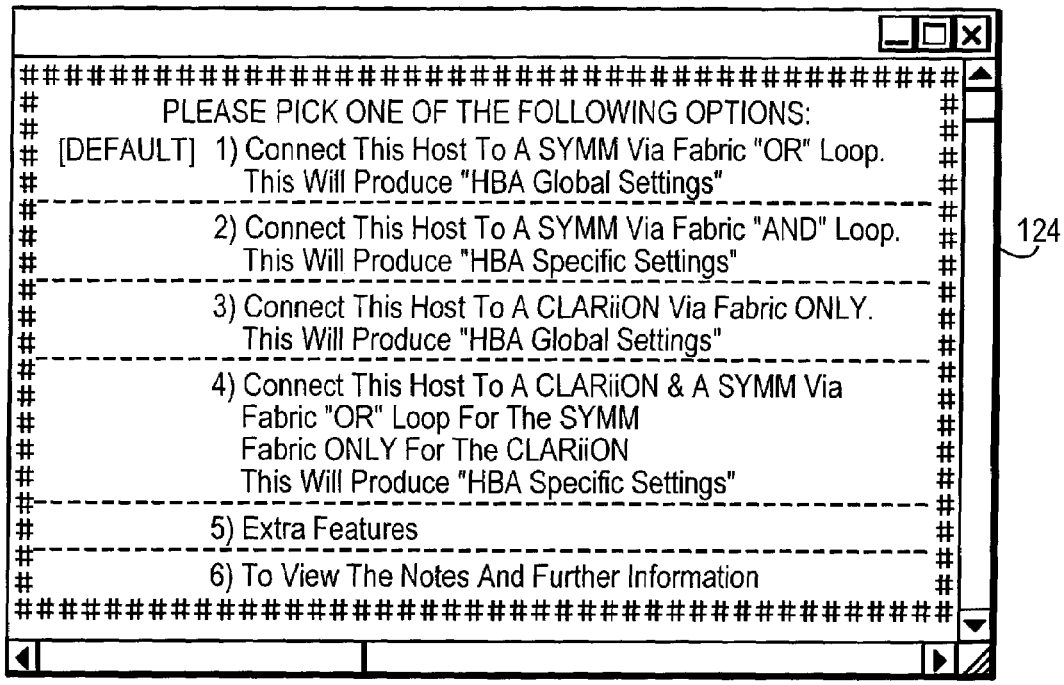
FIG. 12 is another exemplary representation of a user screen for enabling the use of the tool of FIG. 1.

Referring to FIG. 4 which depicts another logical flow diagram, step 49 flows into steps 50-60 which all embody the operation of the connect module 34 (FIG. 2) and which operation is illustrated in FIG. 12. Step 50 involves connecting the host to a Symmetrix via fabric or loop connection, and Step 52 involves connecting the host to a Symmetrix via fabric and loop connection. Step 54 involves connecting the preferred Sun host to a Clariion via fabric connection. Step 56 involves connecting the preferred Sun host to an EMC Symmetrix or Clariion via fabric "or" loop for the Symmetrix or optionally fabric only for the Clariion connection. Step 58 includes changing FA worldwide name (WWN) bindings for the Symmetrix, while step 60 involves changing SP WWN bindings for Clariion. Such WWN changes may be made via calculations via operation of this invention, which provides important advantages over known prior art. Connecting steps 62 and 64 identified with letters B and C respectively flows into identical step 62 and 64 in FIG. 5.

Figure 5:
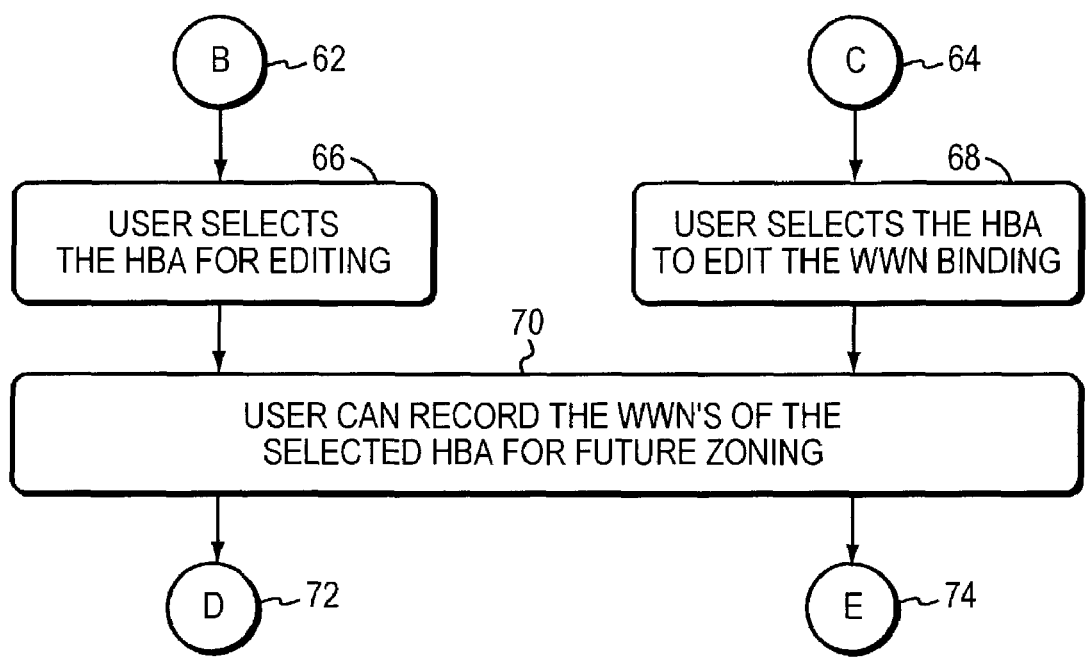
FIG. 5 is another logical flow diagram of the method of this invention carried out with the tool of FIG. 1.
Figure 13:
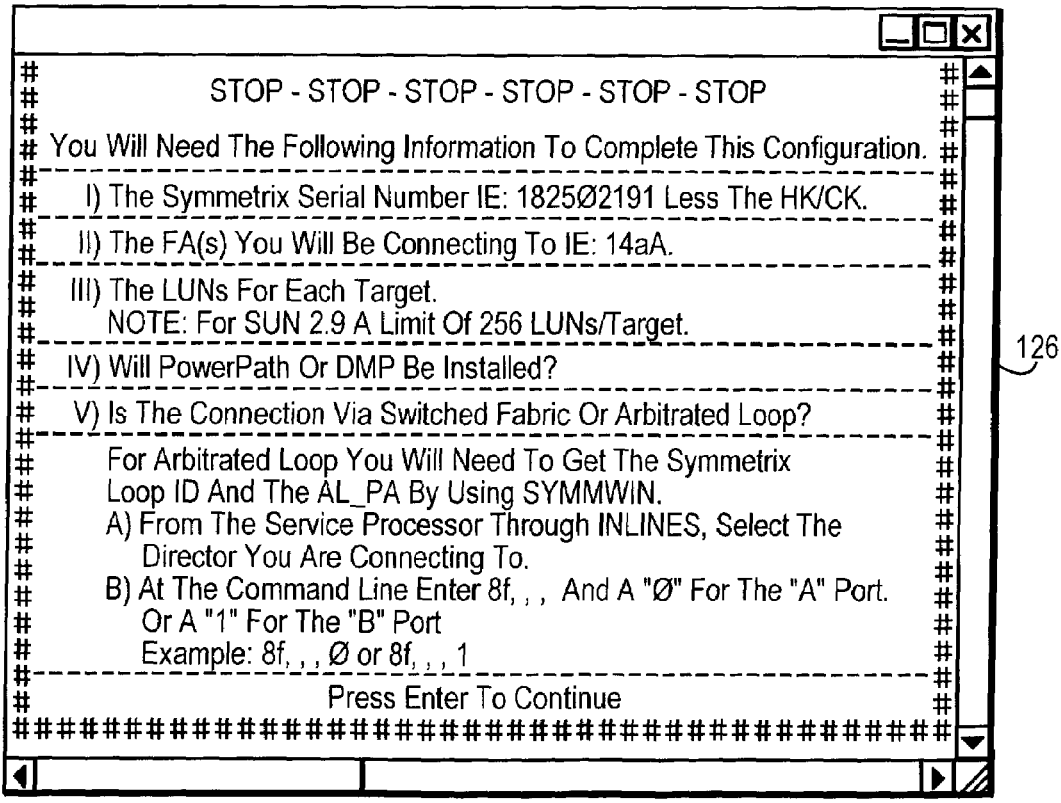
FIG. 13 is another exemplary representation of a user screen for enabling the use of the tool of FIG. 1.
Figure 14:
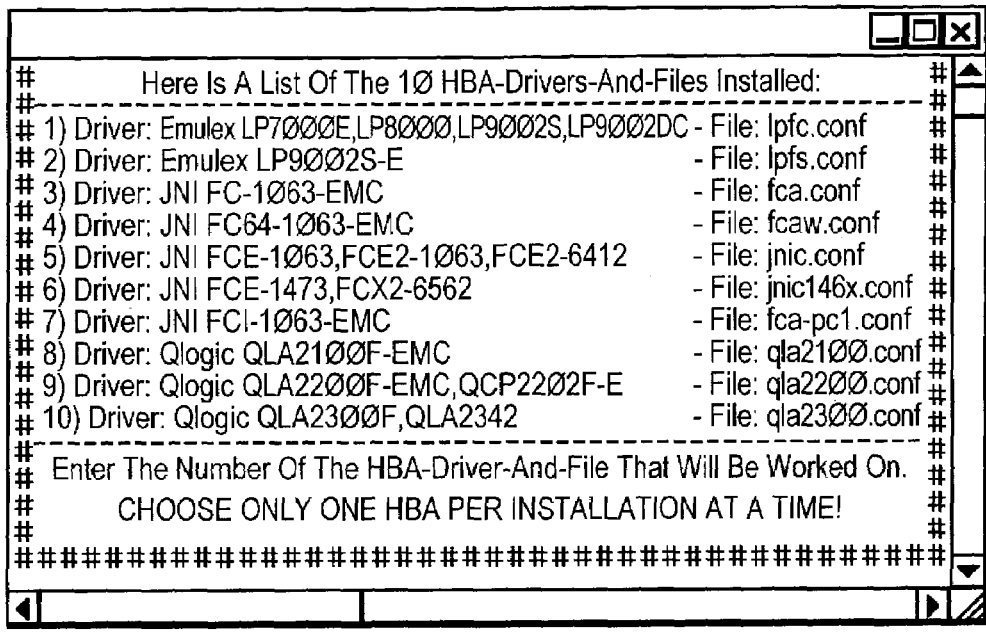
FIG. 14 is another exemplary representation of a user screen for enabling the use of the tool of FIG. 1.
Figure 15:
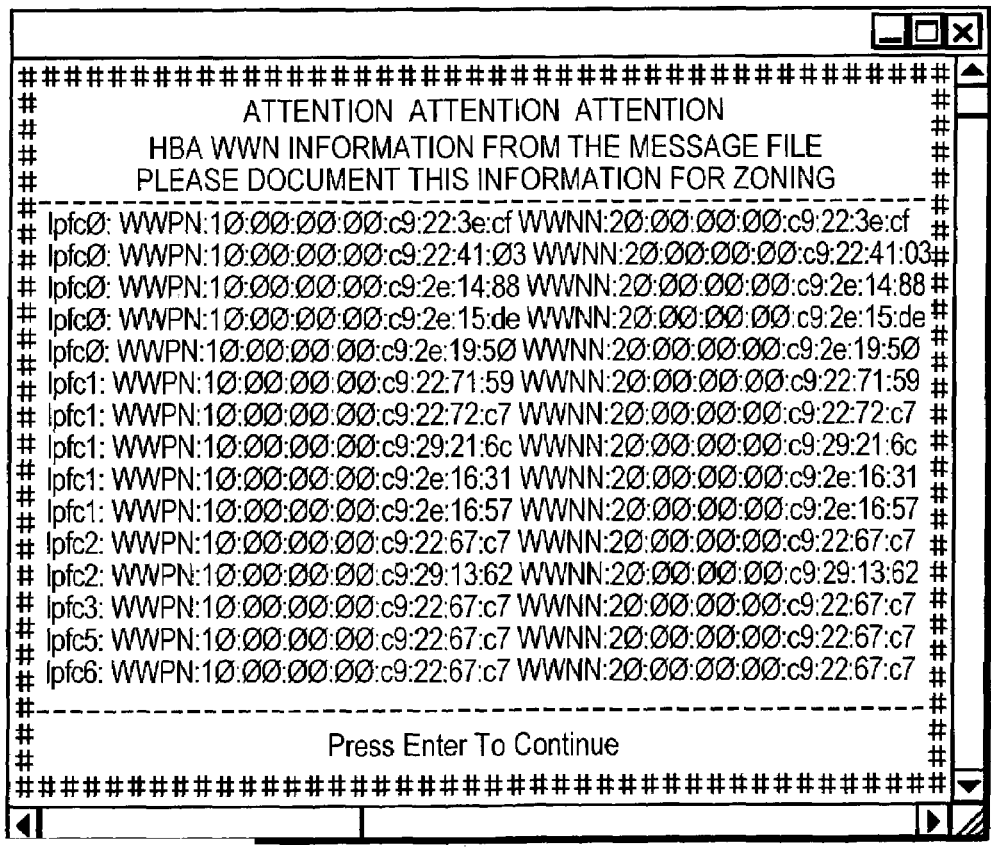
FIG. 15 is another exemplary representation of a user screen for enabling the use of the tool of FIG. 1.

Referring to FIG. 5, connecting step 62 flows into step 66 wherein the user selects the HBA for editing, and likewise connecting step 64 flows into step 68 wherein the user selects the HBA for editing the WWN binding. Following either step, the user can record the WWN's of the selected HBA for future zoning in step 70. The above steps embody the operation of the select module 36 and WWN module 38 (FIG. 2) and which operation is illustrated in FIGS. 13-15. Connecting steps 72 and 74 identified with letters B and C respectively flows into identical step 72 and 74 in FIG. 6.

Figure 6:
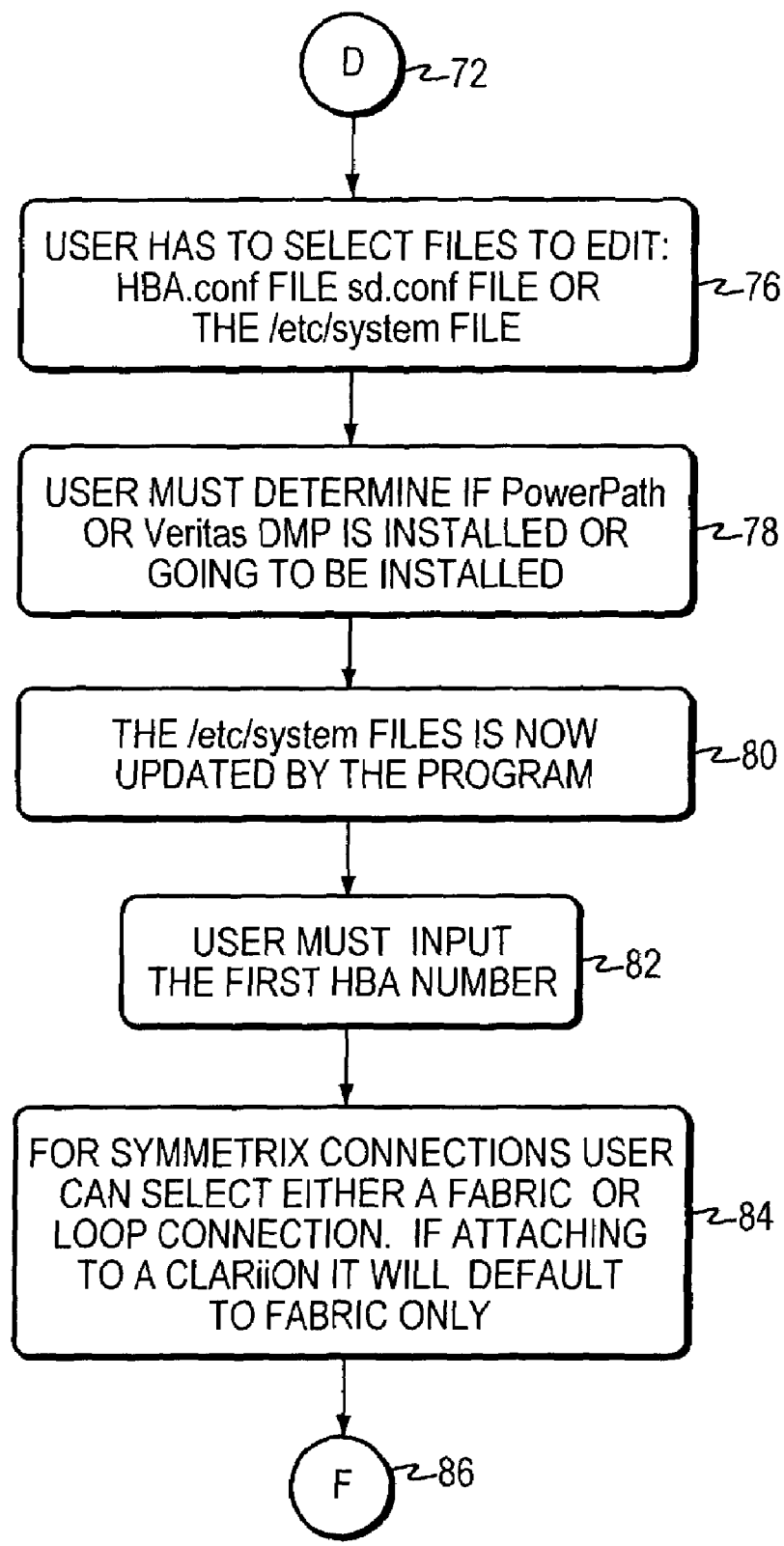
FIG. 6 is another logical flow diagram of the method of this invention carried out with the tool of FIG. 1.

Referring to FIG. 6, connecting step 72 flows into step 76, wherein the user has to select file to edit, e.g. configuration file for the HBA or a system file on the Host, which step is invokes the select and WWN modules and also involves the configure module 40 (FIG. 2). An exemplary embodiment of operation of Steps 76-84 shown in FIG. 6 is illustrated in FIGS. 16-20. In step 78, the user must determine if certain application programs that may interact with the host and storage system, for example EMC PowerPath or Veritas DMP are installed. The file selected such as the etc/system file on the host computer is updated by the program logic 22 in step 80. The user must input the first HBA number for the installation routine in step 82. For the data storage system, certain types of topological configurations are typically available in a data storage environment. For example, for a preferred EMC Symmetrix (sometimes abbreviated herein as a Symm) the user can select either a fabric of loop connection. If attaching to a preferred Clariion data storage system the tool 22 will allow a default of fabric only. The just described actions describe step 84. Step 84 flows into connecting step 86 labeled F, which flows into identical connecting step 86 so-labeled on FIG. 8.

Figure 7:
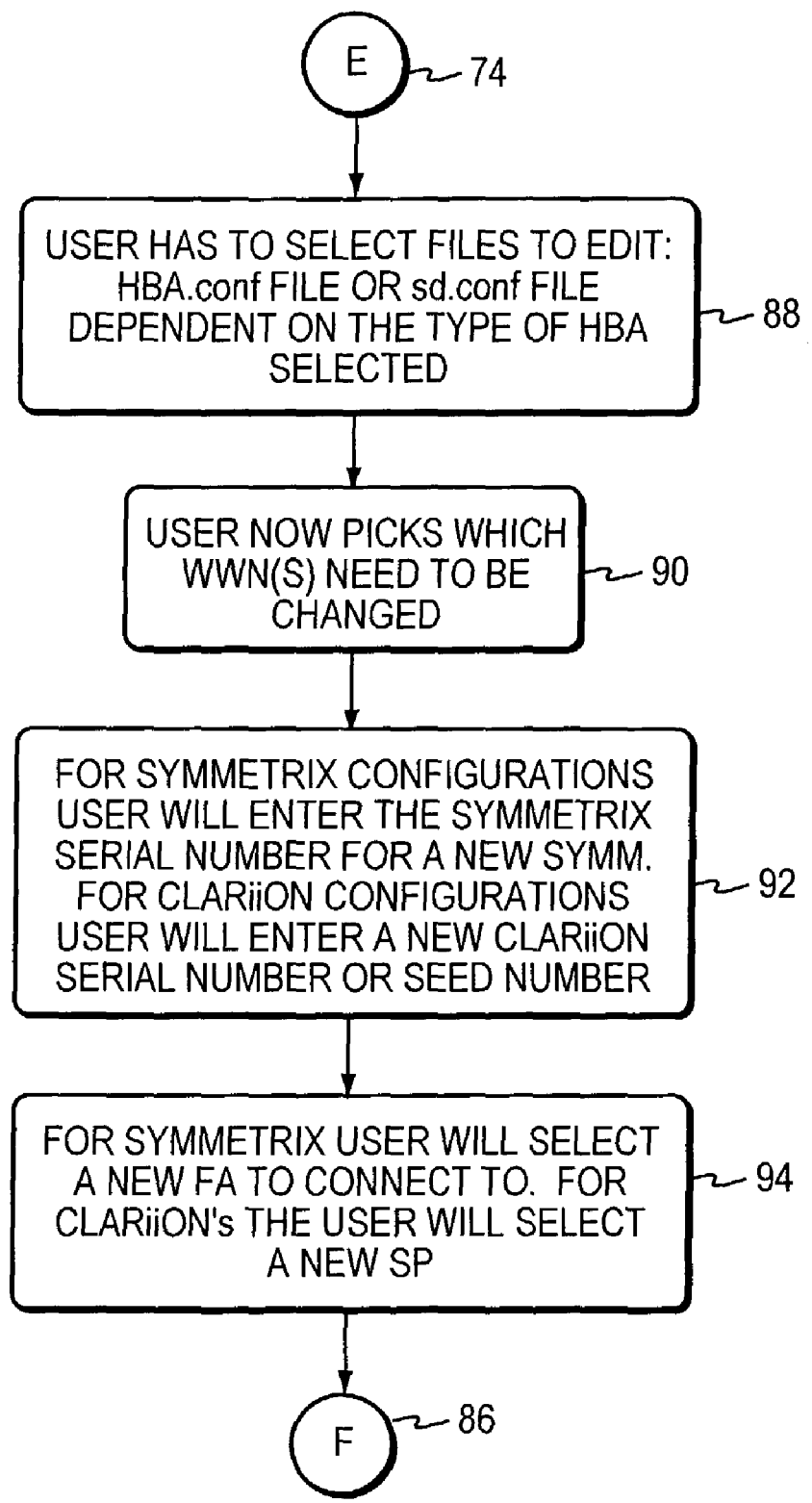
FIG. 7 is another logical flow diagram of the method of this invention carried out with the tool of FIG. 1.

Now referring to FIG. 7, operation begin with connection step 74 branched thereto from FIG. 5 operations of the method steps. Different choices placed a user down this path which has similarities to those shown in FIG. 6, and also involving the select and WWN modules and also involves the configure module 40 (FIG. 2). An exemplary embodiment of operation of Steps 76-84 shown in FIG. 6 is illustrated in FIGS. 16-20. In step 88 the user has to select a file to edit, which may be the HBA configuration file or the sd.conf file dependent on the type of HBA selected. In step 90, the use picks which WWN's need to be changed. To get to the WWN selection, in step 92, the user will enter the Symmetrix serial number, if that is the data storage system, but in any case any manufacturer will have a protocol for defining its WWN and that should be followed. If for example the data storage system is embodied as a Clariion configuration the user will enter a new Clariion serial number or seed number, which is the protocol by which that particular system is designed to arrive at its unique WWN for each unit. In step 94, the use will select a Fiber Channel Adapter (FA) to connect to (FIG. 22 illustrates this action), or for a Clariion embodiment the user will select a new SP. Step 92 flows into connecting step 86 labeled F, which flows into identical connecting step 86 also so-labeled on FIG. 8.

Figure 8:
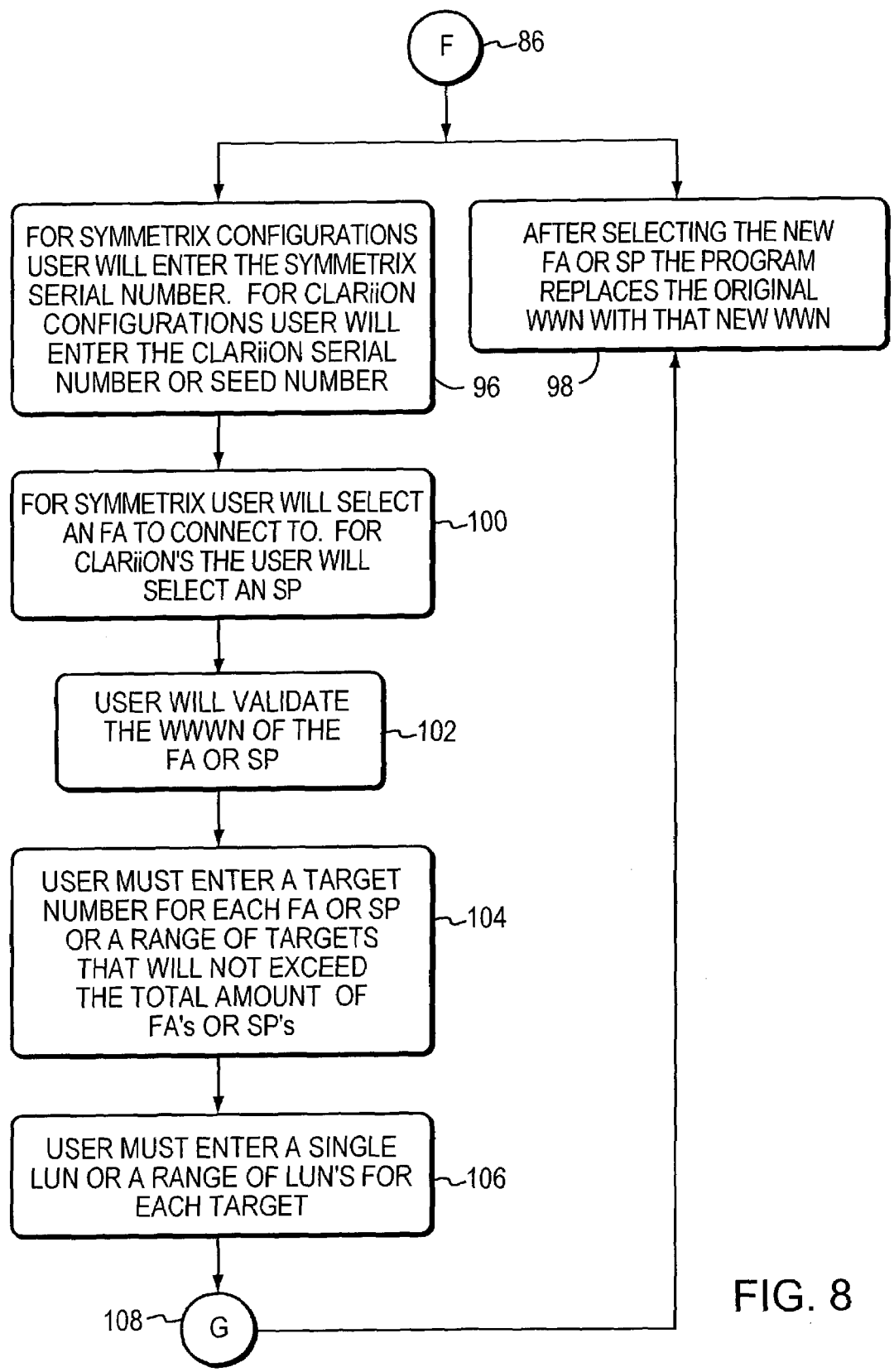
FIG. 8 is another logical flow diagram of the method of this invention carried out with the tool of FIG. 1.

FIG. 8 shows certain steps, which can be carried out, and whether they are is dependent on data storage environment topology, data storage system embodiment, application programs operating in the data storage environment. In step 98, after selecting the new FA or SP the program, logic, or tool 22 replaces the original WWN with the new WWN, which provides an advantage over the prior art and which is discussed herein in detail appearing below. The steps described with reference to FIG. 8 involve the WWN module 38, selection module 36, configure module 40, and update module 42 (FIG. 2). Step 98 flows into connecting step 108 labeled and which in turn flows into the identical connection shown on FIG. 9. Referring still to FIG. 8, in step 96, for Symm configurations the user will enter the serial number, while for Clariion the serial number or seed number may be used to generate a new WWN. In step 100 the Symm user will select an FA to connect to, while the Clariion user will select an SP (see for example FIG. 22). In step 102, the user validates the WWN of the FA or SP (see an example of the user screen shown at FIG. 23 for carrying out this action). In step 104 the user must enter a target number for each FA or SP or a range of targets that will not exceed the total amount of FA's or SP's in the data storage system for which the host has a cooperatively functional relationship (the user screen showing this operation is exemplified at FIG. 24). The user must enter a single Logical Unit Number (LUN) for data storage volumes in the data storage system or a range of LUN's for each target in step 106 (see example user screen at FIG. 25). Step 106 flows into step 108 labeled as "G" and which flows into connecting step 108 for FIG. 9.

Figure 9:
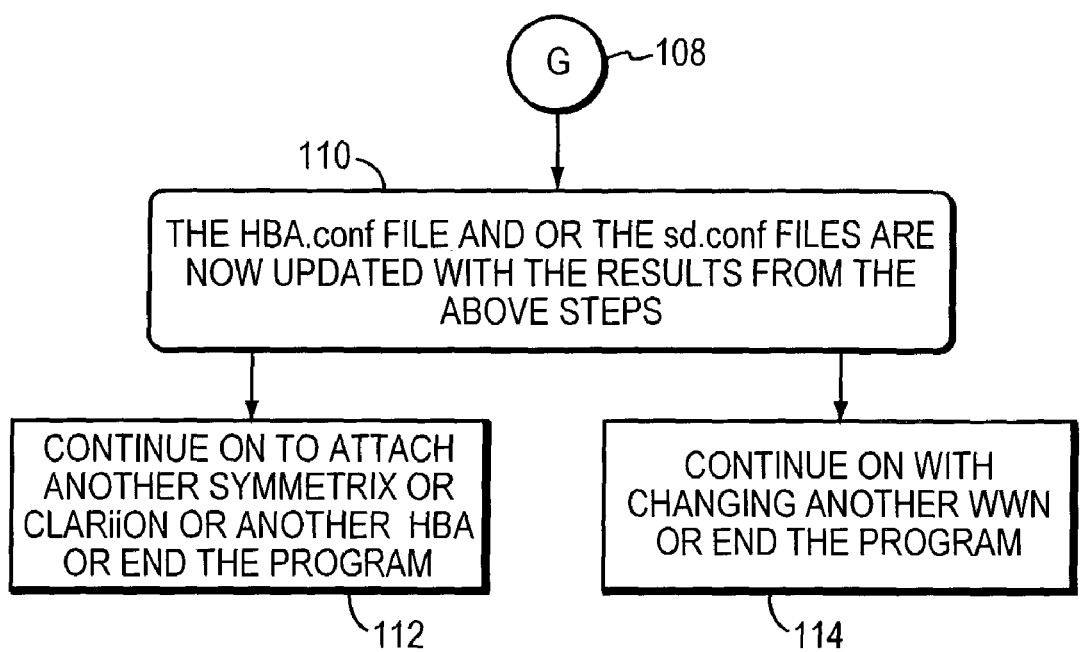
FIG. 9 is another logical flow diagram of the method of this invention carried out with the tool of FIG. 1.

Referring to FIG. 9, step 108 flows into step 110 wherein the HBA configuration file and or the sd.conf files are update with the results of all of the above steps involving the update module 42 of the tool 22 (FIGS. 1 and 2). Options are selectable in respective steps 112 and 114 for continuing or ending operation of the program or in other words stopping the run module 32, and the example user screen related to such steps in shown in FIG. 26, In step 112 the user may continue on to attach another data storage system to the host or another HBA to another data storage system or end the program. In step 114, the user has a selectable option to finish or change another WWN.

For the sake of completeness, FIGS. 10-26 are now described in more detail. FIG. 10 shows an introduction for the user and illustrates an exemplary case, wherein the version number of the tool is given, and its function is described. I.e., "(f)or connecting a Sun Solaris Host to a particular data storage system, which is this example case is an EMC Symmetrix. This Symm may be connected via arbitrated loop or switched fabric, or the tool also supports other data storage systems. Including for example the EMC Clariion via switch fabric.

FIG. 11 shows screen 122 on which the user may select one of several options in accord with the operating system of the host computer, for example a Sun Host with OS 2.9, or SUN Host with OS 2.7/2.8, or Sun Host with OS 2.5.1/2.6. A default selection is provided for convenience as shown.

FIG. 12 shows another exemplary screen 124 showing several options available for the user and as described above in the description of certain method steps. Option 1 is the default in this example and allows the user to connect this host to a Symm via Fabric "OR" Loop, wherein this will produce "HBA Global Settings." Option 2 is another choice that provides for connecting the host to a Symm via Fabric "AND" Loop, and this will also produce "HBA Global Settings." Option 3 is another choice that provides for connecting the host to a Clariion via Fabric only, and this will also produce "HBA Global Settings." Option 4 provides connecting the host to both types of data storage systems via Fabric "OR" loop for the Symm and Fabric Only for the Clariion to produce HBA Specific Settings. Option 5 allows extra features, and notes and further information are available as option 6.

Figure 16:
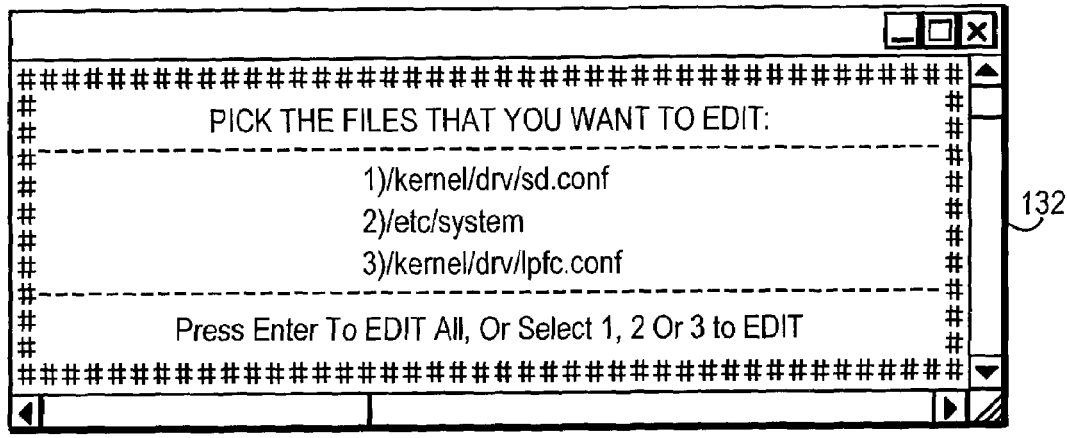
FIG. 16 is another exemplary representation of a user screen for enabling the use of the tool of FIG. 1.
Figure 17:
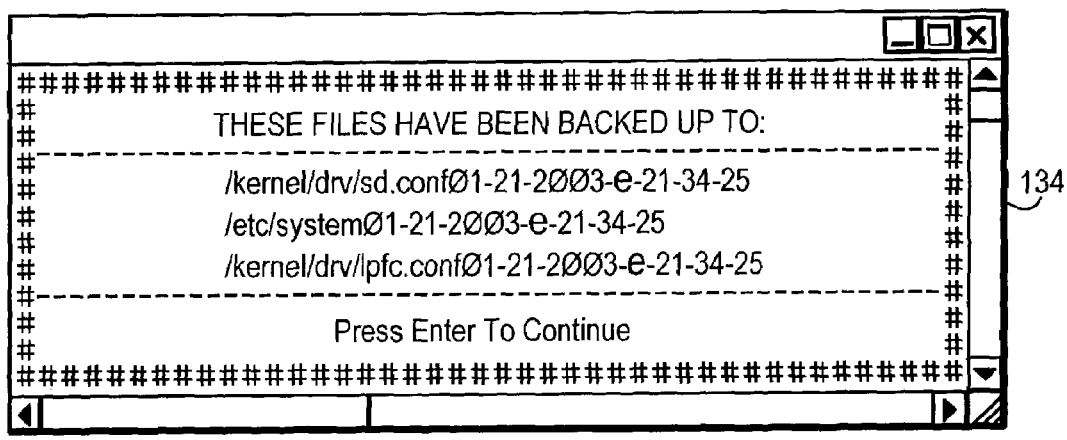
FIG. 17 is another exemplary representation of a user screen for enabling the use of the tool of FIG. 1.

FIG. 13 shows screen 126 wherein the user is warned of information needed to complete the configuration, while FIG. 13 on screen 128. FIG. 14 shows screen 130 that includes a selectable list of HBA's that may be chosen including in the example: FIG. 15 shows on screen 130 the WWN information generated form, which can be recorded in some fashion by the user to use for purposes such as zoning. FIG. 16 shows screen 132, for allowing the user to select which files they may edit. The user may edit in one the three options or a select all for editing, and which in the exemplary case include: (1) /kernel/drv/sd.conf; (2) /etc/system; and (3) kernel/drv/lpfc.conf. FIG. 17 shows screen 134 that conveniently shows the user, which files the system, files have been backed up to.

Figure 18:
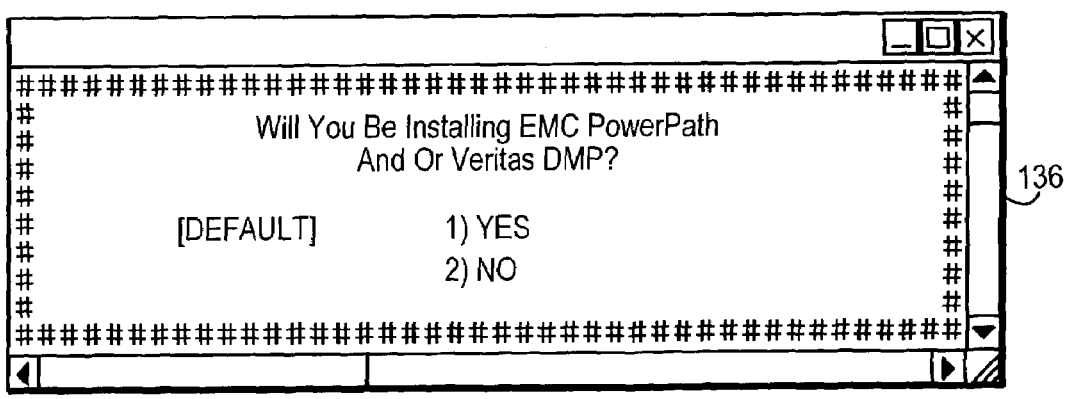
FIG. 18 is another exemplary representation of a user screen for enabling the use of the tool of FIG. 1.

FIG. 18 shows screen 136 allows the user to specify which application programs 25 (FIG. 1) are on the host or can be installed on the host for cooperating with the data storage system in a production environment. In this example the application programs are EMC PowerPath and Veritas DMP.

Figure 19:
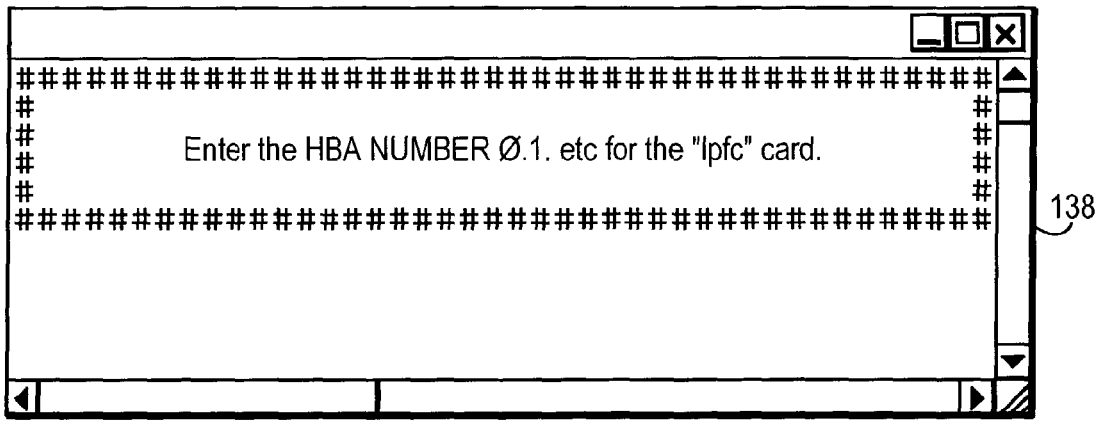
FIG. 19 is another exemplary representation of a user screen for enabling the use of the tool of FIG. 1.
Figure 20:
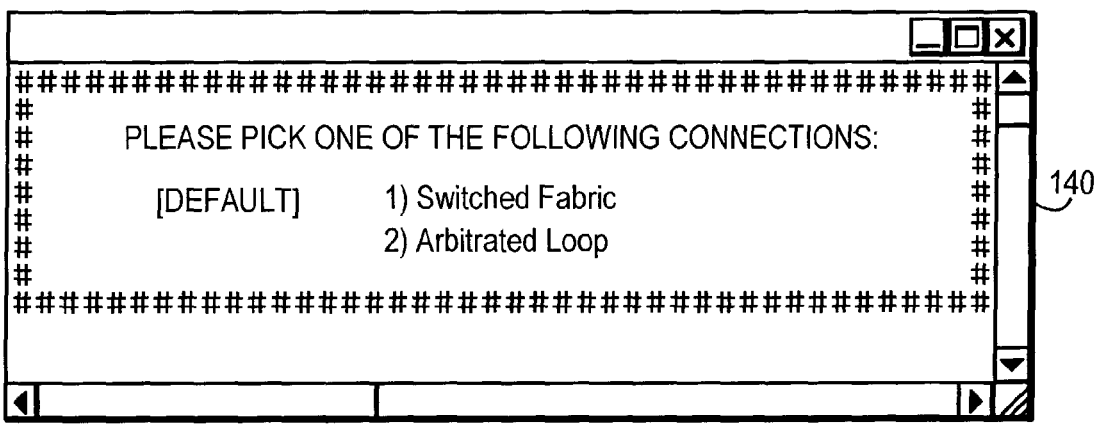
FIG. 20 is another exemplary representation of a user screen for enabling the use of the tool of FIG. 1.
Figure 21:
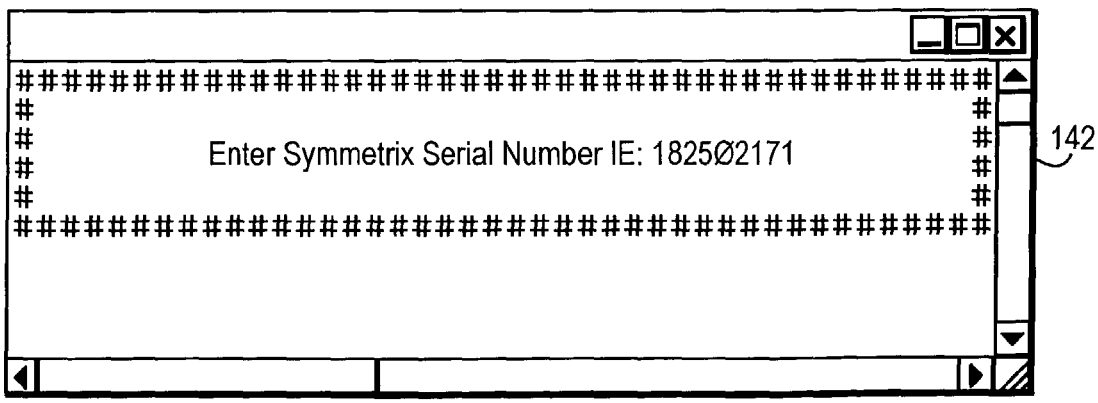
FIG. 21 is another exemplary representation of a user screen for enabling the use of the tool of FIG. 1.

FIG. 19 shows on Screen 138 the user's instructions to enter the HBA number for configuration, which FIG. 20 shows on screen 140 the connection options of switched fabric or arbitrated loop depending on the data storage system, and FIG. 21 shows on 142 the user's instruction to enter the Symm serial number for calculation/generation of its WWN.

FIG. 22 shows on screen 144 the users opportunity presented to pick a single FA or more that one. FIG. 23 shows on screen 146 the user's chance to verify the generated WWN and either change or accept.

Figure 24:
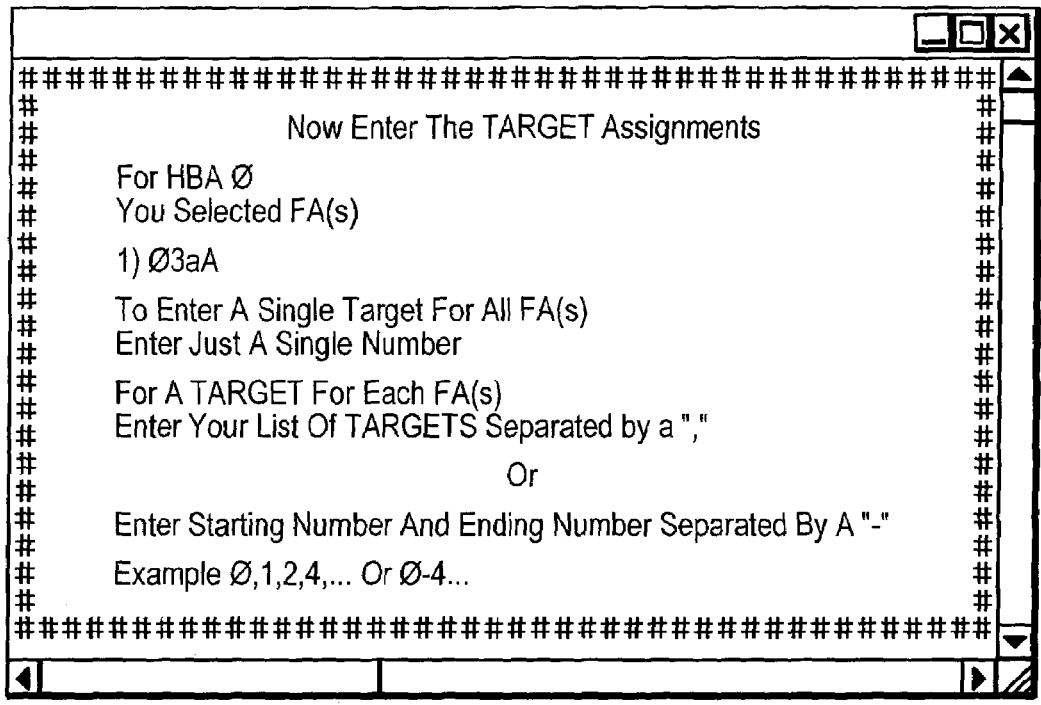
FIG. 24 is another exemplary representation of a user screen for enabling the use of the tool of FIG. 1.
Figure 25:
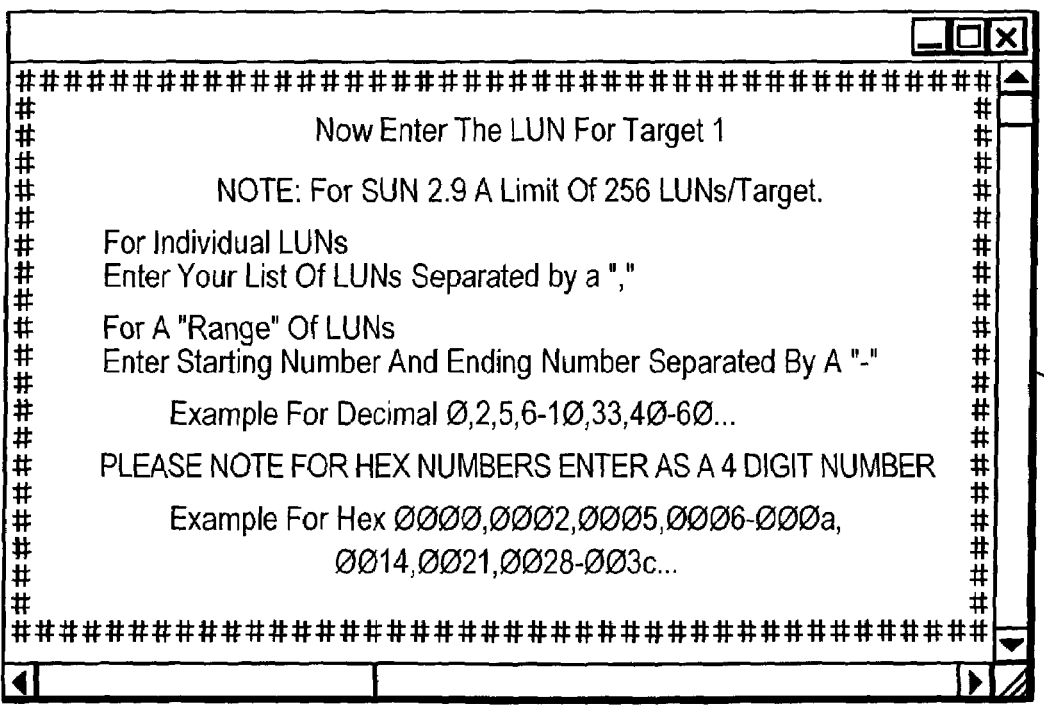
FIG. 25 is another exemplary representation of a user screen for enabling the use of the tool of FIG. 1.
Figure 26:
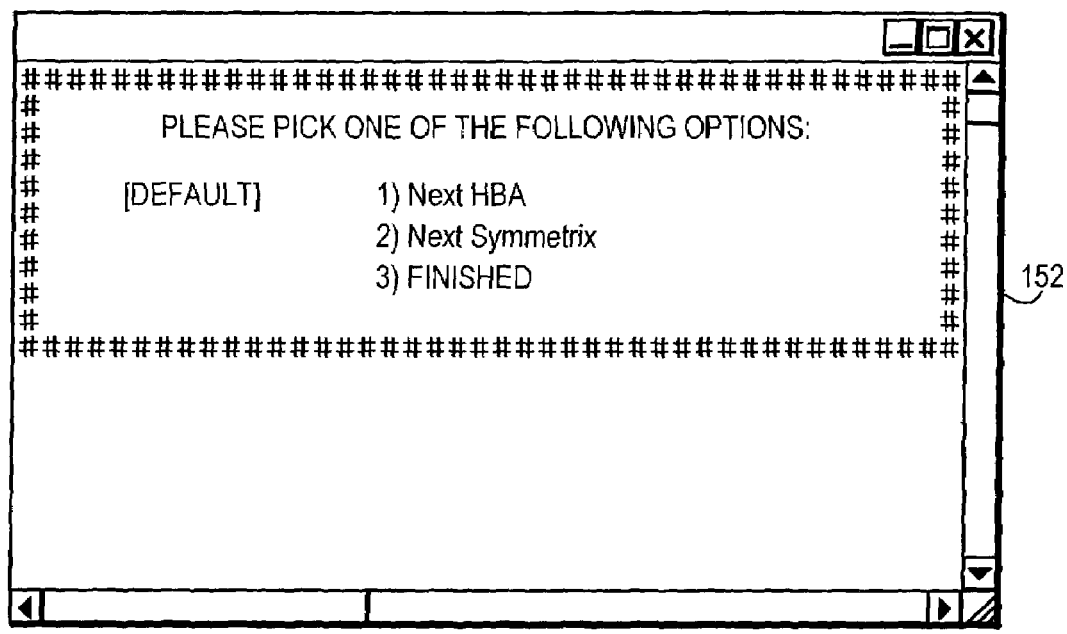
FIG. 26 is another exemplary representation of a user screen for enabling the use of the tool of FIG. 1.

FIG. 24 shows on user screen 148 the users chance to enter the target assignments in accordance with the selected FA(s) per HBA. FIG. 25 shows on screen 150 the user's chance to enter the LUN for each target and provides some helpful information to the user about what is acceptable of note according to limitations of the host operating system. Finally on FIG. 26 the user is presented on screen 152 with options as discussed in relation to FIG. 9 method steps above. In this example the options include selected another HBA or data storage system (e.g. a Symmetrix) or ending the run of the logic tool.

A system, method, and apparatus have been described for configuring a host computer to cooperatively operate with a data storage system in a data storage environment. The tool embodied in this invention may be used aid configuration of a host computer, such as a SUN Solaris host for connection and cooperative operation with a data storage system, e.g. either an EMC Symmetrix or Clariion disk array via various switching and topological schemes including via "Switched Fabric" or "Arbitrated Loop". The tool may support multiple file configurations and different HBA types and work in various computing environments to configure computers to communicate and cooperatively operate with data storage systems.

An important advantage provided by the tool is its ability to calculate WWN's in accordance with predetermined formula for doing so in accordance with protocols prescribed for a particular data storage system for which the host to be configured with is cooperatively operational. The inventor has critically recognized a long-felt need for such an operational advantage because while the use of WWN's for components which function in a data storage environment has become widespread in the advent of the internet, and particularly its embodiment known as the world wide name. However, without a way to generate WWN's the host configuration tool would be rendered unable to connect to a data storage having a particular requirement that it's communication cards be identified in communications by their WWN unless that information was somehow retrieved from the data storage system itself. Instead using information related to the data storage systems predetermined way of allocating its own schema for defining WWN's the tool of this invention generates the WWN for use by the tool is configuring the host computer to communicate with that component.

Figure 27:
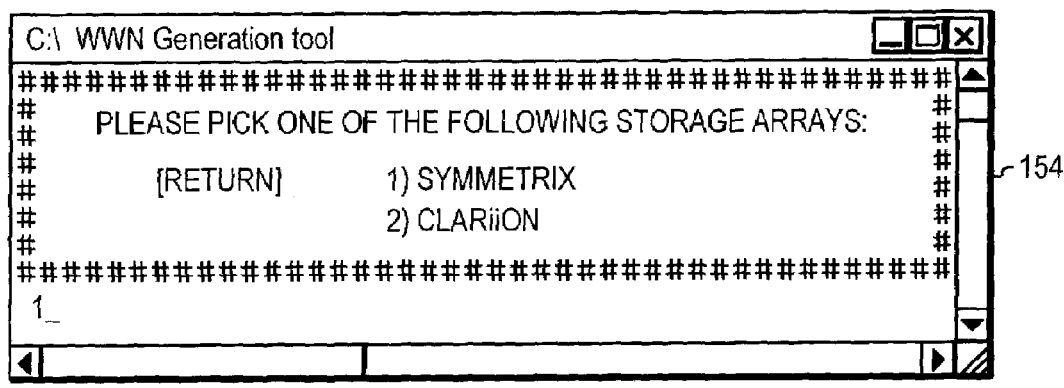
FIG. 27 is another exemplary representation of a user screen for enabling the use of the tool of FIG. 1 and which is useful with the world wide name (WWN) module of this tool shown in FIG. 2.
Figure 28:
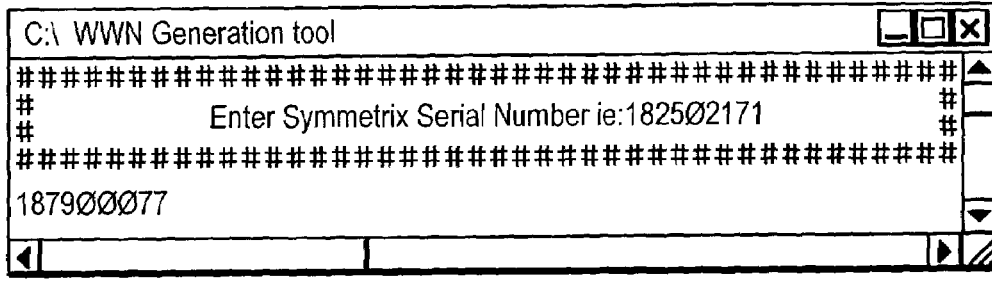
FIG. 28 is another exemplary representation of a user screen for enabling the use of the tool of FIG. 1 and which is useful with the world wide name (WWN) module of this tool shown in FIG. 2.

FIGS. 27-36 show an exemplary representation of user screens useful in carrying out the WWN generation method of the present invention. Referring to FIG. 27, and also referring to an exemplary preferred embodiment, the user is allowed to input using information from screen 154 the choice of a data storage system or storage array to communicate with, e.g. an EMC Symmetric or Clariion. Knowing the serial number of the chosen device, which is a Symmetrix in this example, the user may enter it using guidance prompts of screen 156 (FIG. 28).

Figure 29:
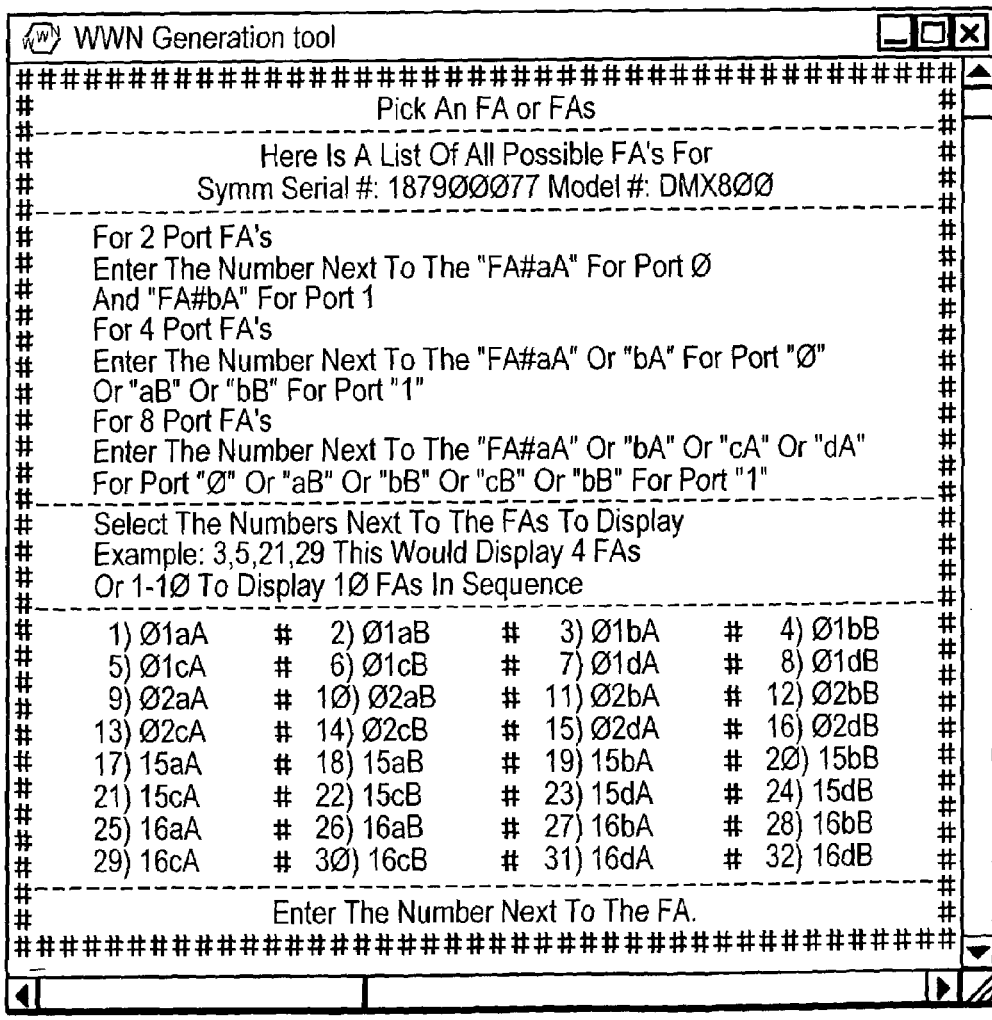
FIG. 29 is another exemplary representation of a user screen for enabling the use of the tool of FIG. 1 and which is useful with the world wide name (WWN) module of this tool shown in FIG. 2.
Figure 30:
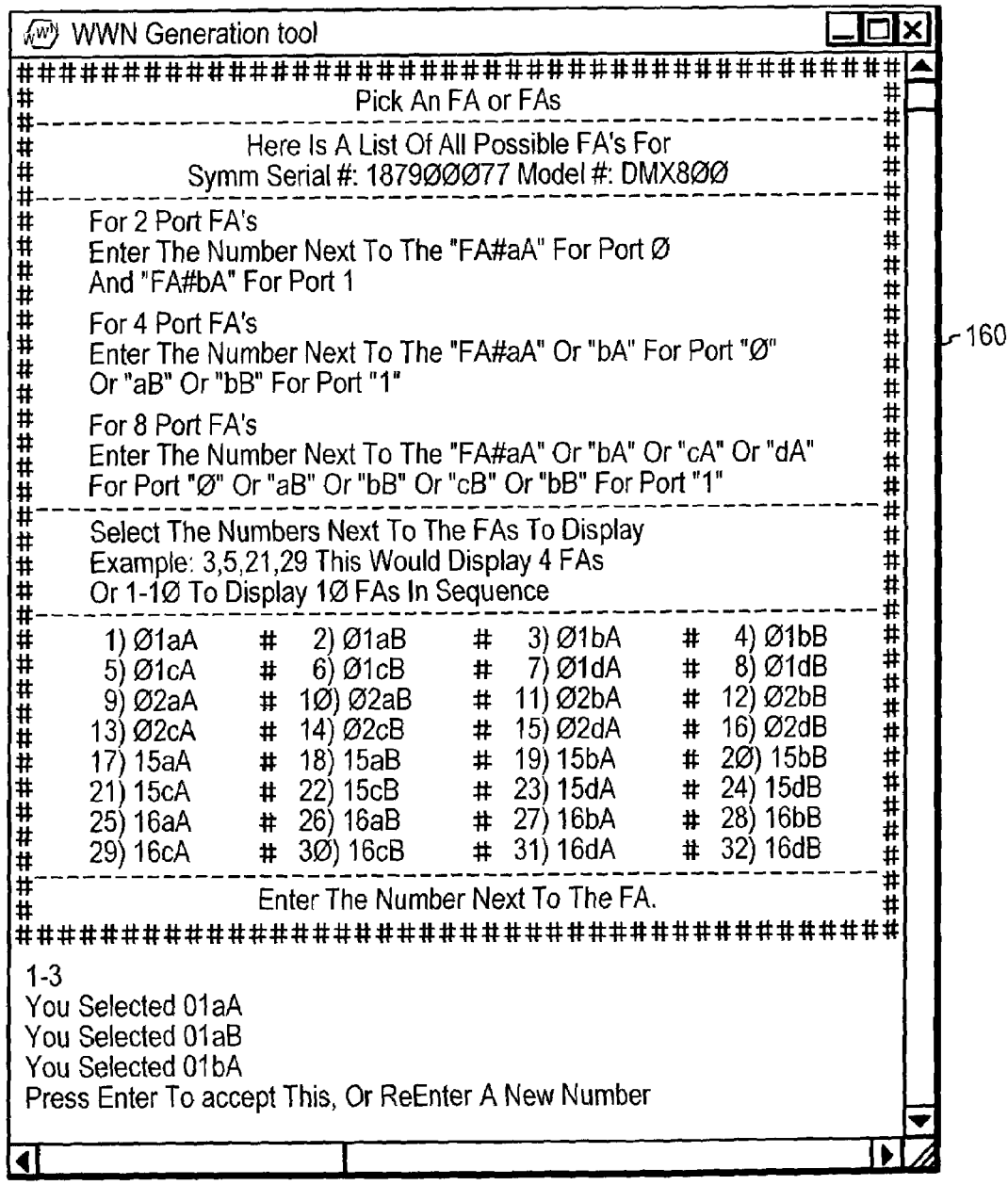
FIG. 30 is another exemplary representation of a user screen for enabling the use of the tool of FIG. 1 and which is useful with the world wide name (WWN) module of this tool shown in FIG. 2.
Figure 31:
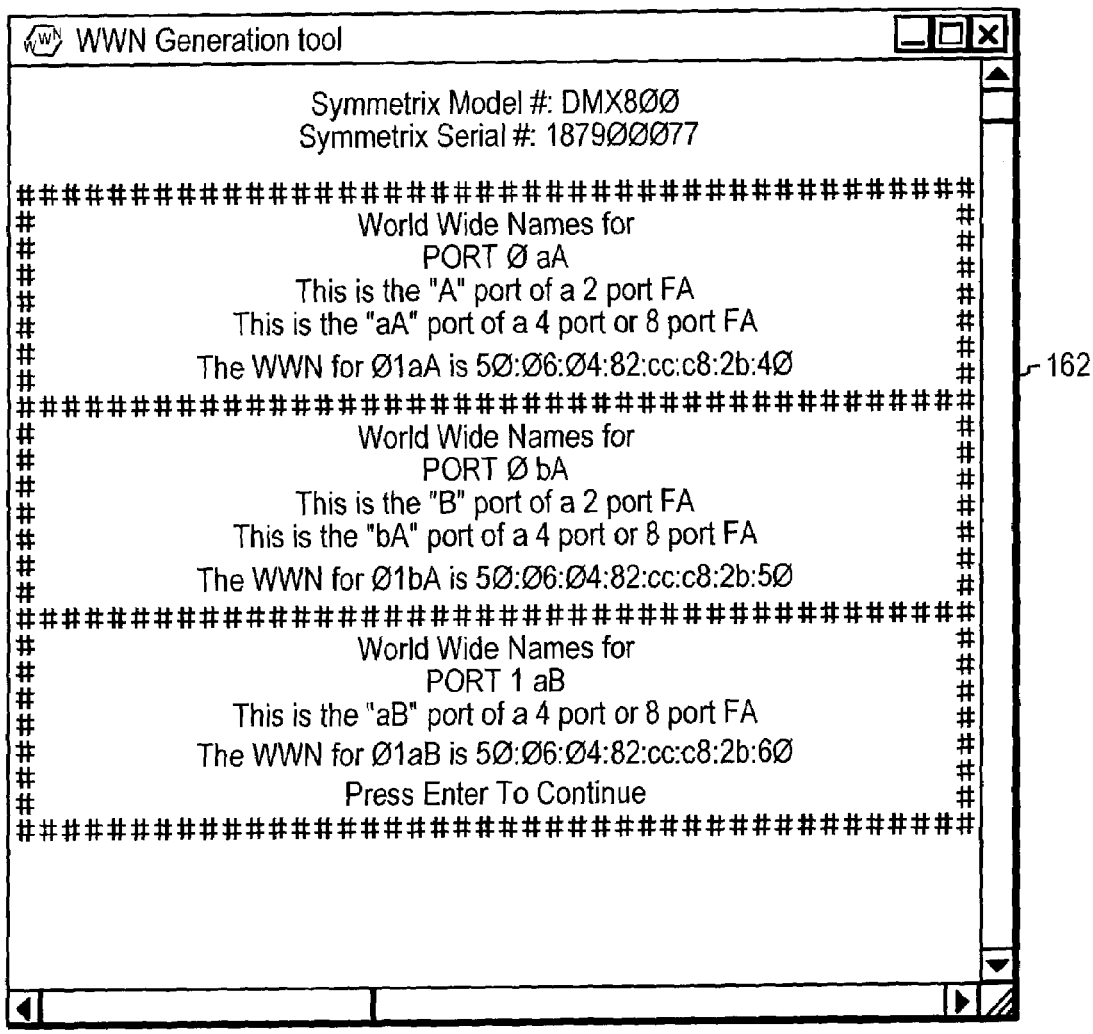
FIG. 31 is another exemplary representation of a user screen for enabling the use of the tool of FIG. 1 and which is useful with the world wide name (WWN) module of this tool shown in FIG. 2.
Figure 32:
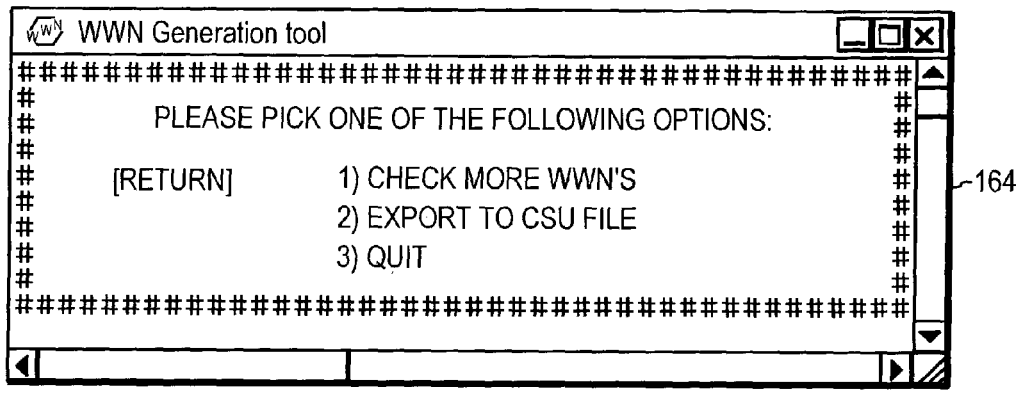
FIG. 32 is another exemplary representation of a user screen for enabling the use of the tool of FIG. 1 and which is useful with the world wide name (WWN) module of this tool shown in FIG. 2.
Figure 33:
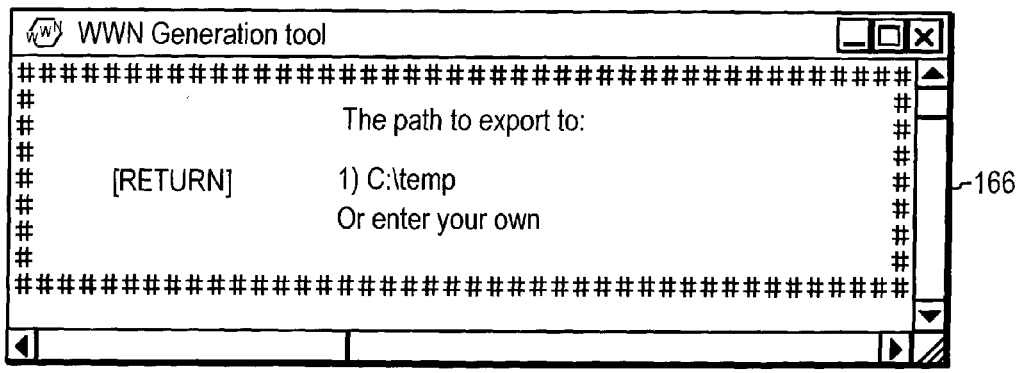
FIG. 33 is another exemplary representation of a user screen for enabling the use of the tool of FIG. 1 and which is useful with the world wide name (WWN) module of this tool shown in FIG. 2.

Once the serial number is entered the tool returns the FA's available for communicating with on the selected storage array, using information shown on screen 158 of FIG. 29, wherein the FA's are identified by port number. The tool may gather such information because it is available once the system is identified by serial number and can be pre-stored for use by the tool or otherwise gathered. FIG. 30 shows the feedback on screen 160 given by the tool to the user to verify choices for FA's to communicate with after the host is configured for such. Using predetermined information in accordance with the schema of the data storage manufacturer, the tool generates the WWN for each FA selected for the identified data storage system (in this example case an EMC Symmetrix model DMX800) and shows the WWN's to the user on screen 162 (FIG. 31).

Figure 34:
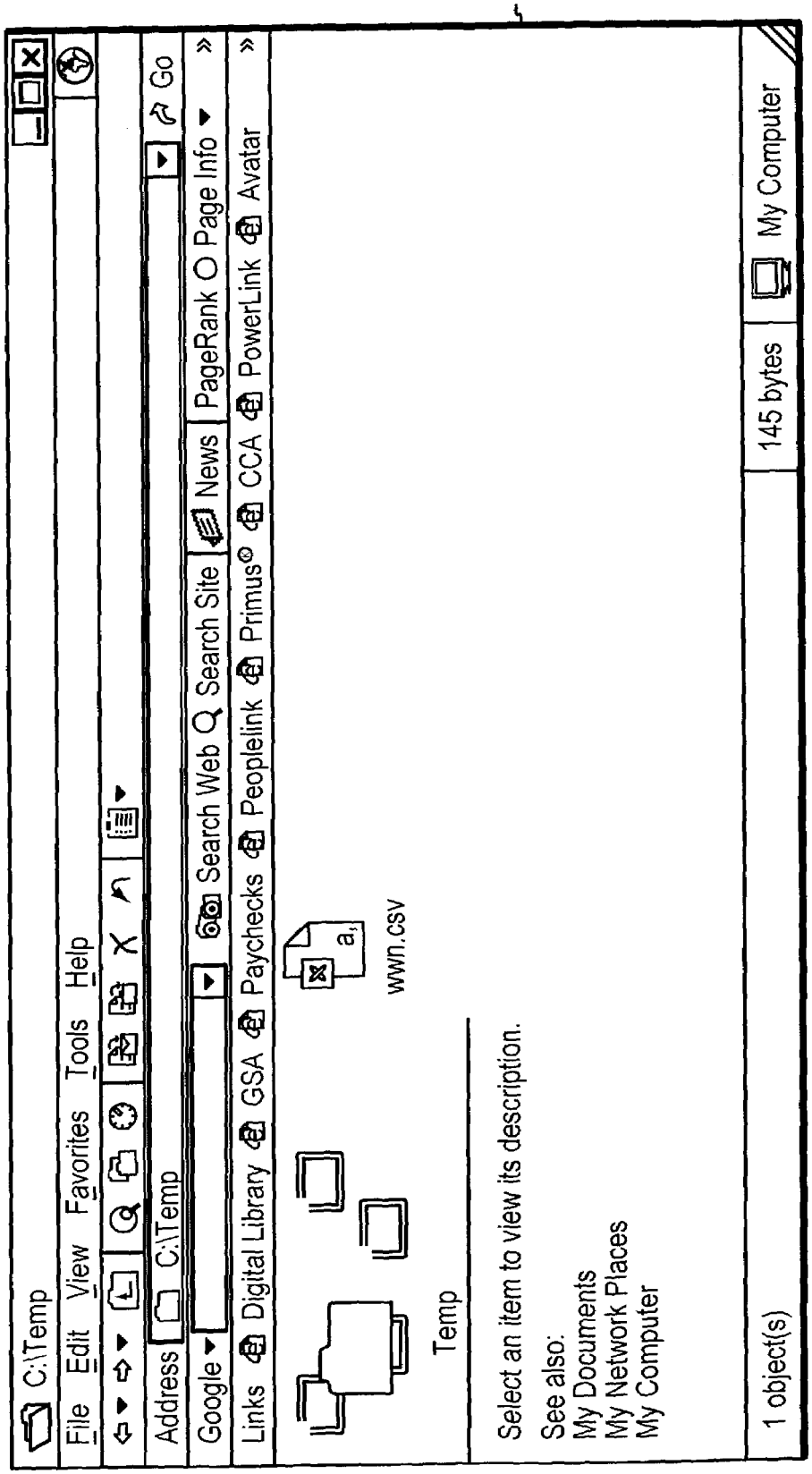
FIG. 34 is another exemplary representation of a user screen for enabling the use of the tool of FIG. 1 and which is useful with the world wide name (WWN) module of this tool shown in FIG. 2.
Figure 35:
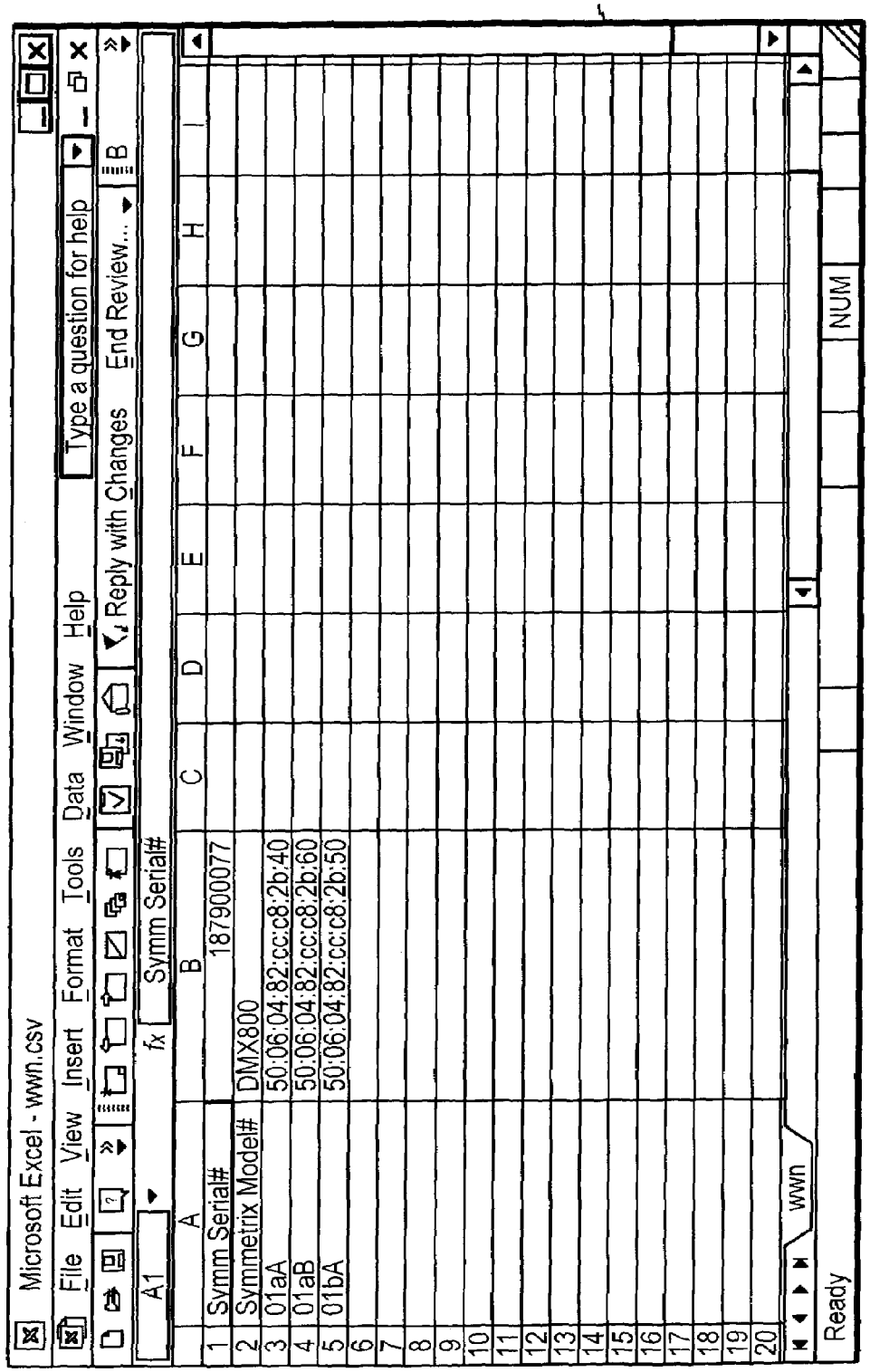
FIG. 35 is another exemplary representation of a user screen for enabling the use of the tool of FIG. 1 and which is useful with the world wide name (WWN) module of this tool shown in FIG. 2.
Figure 36:
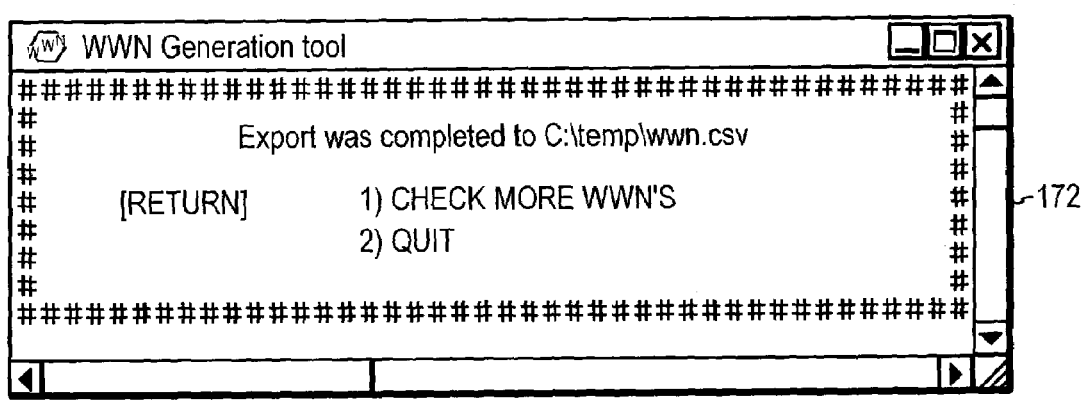
FIG. 36 is another exemplary representation of a user screen for enabling the use of the tool of FIG. 1 and which is useful with the world wide name (WWN) module of this tool shown in FIG. 2.

Reference is made now to FIGS. 32-36. Shown on FIG. 32, a user is presented with options on screen 164 that include checking more WWN's, exporting to a file that may for example be imported into a spreadsheet or database for the user, or to quit. By selecting the second choice of exporting to file, the menu on screen 166 (FIG. 33) prompts for either the default path to export or allowing the option of entering the user's own path selection. FIG. 34 shows user screen 168 portraying the file after export, while FIG. 35 shows on screen 170 an exported list of WWN information generated by this tool and placed for example in an Excel Spreadsheet format. Finally, on FIG. 36, the user may select from information on screen 172 the option to quit or check (generate) more WWN's.

Having described a preferred embodiment of the present invention, it may occur to skilled artisans to incorporate these concepts into other embodiments. In particular other advantages and implementations of this invention may occur to one skilled in the art that are outside of the preferred embodiments or examples given. Nevertheless, this invention should not be limited to the disclosed embodiment, but rather only by the spirit and scope of the following claims and their equivalents.

What is claimed is:

1. A method of generating a world wide name related to a component in a data storage system for use in enabling a host computer to communicate with the data storage system, the method comprising the steps of:

receiving information at the host computer related to the selection of a data storage system for communicating with the host computer;

presenting to the host computer a list of communication channels or interfaces at the data storage system based on the received information;

receiving at the host computer information related to the selection of at least one communication channel or interface from the list; and generating a world wide name at the host computer for each communication channel or interface selected for which information was received, wherein the world wide name is useful for enabling the host computer to communicate with the selected data storage system, wherein the information related to the selected data storage system is a serial number of the data storage system and wherein the generation of the world wide name at the host computer is implemented without ever using the host computer to communicate with the data storage system to retrieve computer readable information from the data storage system.

2. The method of claim 1, and further comprising the steps of:

using the generated world wide name with a configuration program to establish communication between the host computer and the selected data storage system.

3. The method of claim 1, wherein the world wide name is exported to a file for use with a computerized spreadsheet.

4. A system for generating a world wide name related to a component in a data storage system for use in enabling a host computer to communicate with the data storage system, the system comprising:

a computer-readable storage medium encoded to enable the execution of the steps of:

receiving information at the host computer related to the selection of a data storage system for communicating with the host computer;

presenting to the host computer a list of communication channels or interfaces at the data storage system based on the received information;

receiving at the host computer information related to the selection of at least one communication channel or interface from the list; and generating a world wide name at the host computer for each communication channel or interface selected for which information was received, wherein the world wide name is useful for enabling the host computer to communicate with the selected data storage system, wherein the information related to the selected data storage system is a serial number of the data storage system and wherein the generation of the world wide name at the host computer is implemented without ever using the host computer to communicate with the data storage system to retrieve computer readable information from the data storage system.

5. The system of claim 4, and further comprising the steps of:

using the generated world wide name with a configuration program to establish communication between the host computer and the selected data storage system.

6. The system of claim 4, wherein the world wide name is exported to a for use with a computerized spreadsheet.

7. An apparatus for generating a world wide name related to a component in a data storage system for use in enabling a host computer to communicate with the data storage system, the apparatus comprising:

means for receiving information at the host computer related to the selection of a data storage system for communicating with the host computer;

means for presenting to the host computer a list of communication channels or interfaces at the data storage system based on the received information;

means for receiving information at the host computer related to the selection of at least one communication channel or interface from the list; and means at the host for generating a world wide name for each communication channel or interface selected for which information was received, wherein the world wide name is useful for enabling the host computer to communicate with the selected data storage system, wherein the information related to the selected data storage system is a serial number of the data storage system and wherein the generation of the world wide name at the host computer is implemented without ever using the host computer to communicate with the data storage system to retrieve computer readable information from the data storage system.

8. The apparatus of claim 7, wherein the world wide name is exported to a for use with a computerized spreadsheet.

* * * * *